US011340356B2

(12) United States Patent
Berntorp et al.

(10) Patent No.: US 11,340,356 B2
(45) Date of Patent: May 24, 2022

(54) SYSTEM AND METHOD FOR INTEGER-LESS GNSS POSITIONING

(71) Applicant: Mitsubishi Electric Research Laboratories, Inc., Cambridge, MA (US)

(72) Inventors: Karl Berntorp, Cambridge, MA (US); Marcus Greiff, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 283 days.

(21) Appl. No.: 16/789,457

(22) Filed: Feb. 13, 2020

(65) Prior Publication Data

US 2021/0278548 A1 Sep. 9, 2021

(51) Int. Cl.
| G01S 19/44 | (2010.01) |
| G01S 19/04 | (2010.01) |
| G01S 19/07 | (2010.01) |
| G01S 19/29 | (2010.01) |
| G01S 19/51 | (2010.01) |

(52) U.S. Cl.
CPC .............. *G01S 19/44* (2013.01); *G01S 19/04* (2013.01); *G01S 19/07* (2013.01); *G01S 19/29* (2013.01); *G01S 19/51* (2013.01)

(58) Field of Classification Search
CPC .......... G01S 19/44; G01S 19/04; G01S 19/07; G01S 19/29; G01S 19/51
USPC .......................... 342/357.38, 357.27, 357.24
See application file for complete search history.

(56) References Cited

U.S. PATENT DOCUMENTS

| 2008/0165053 A1* | 7/2008 | Liu .................. G01S 19/32 342/357.27 |
| 2012/0255335 A1* | 10/2012 | Fairweather ............. C05D 1/00 71/61 |

* cited by examiner

*Primary Examiner* — Bo Fan
(74) *Attorney, Agent, or Firm* — Gennadiy Vinokur; Hironori Tsukamoto

(57) ABSTRACT

A system for tracking a state of a GNSS receiver uses a subset of the measurements of satellite signals selected to avoid the need for intermediate integers ambiguity estimate. The system selects the subset of measurements for the state tracking such that each measurement in the selected subset of measurements is formed by a weighted combination of multiple different measurements from the set of measurements. The system uses a probabilistic state estimator that tracks the state of the GNSS receiver using a probabilistic motion model subject to noise and a probabilistic measurement model relating the selected subset of the measurements of satellite signals to the current state of the receiver.

19 Claims, 28 Drawing Sheets

| Notation | Description | Unit |
|---|---|---|
| $P$ | Code observation | m |
| $\rho$ | Distance between the receiver and the satellite | m |
| $c$ | Speed of light | m/s |
| $\delta T$ | Receiver clock bias | s |
| $\delta t$ | Satellite clock bias | s |
| $I$ | Ionospheric delay | m |
| $T$ | Tropospheric delay | m |
| $\varepsilon$ | Code observation noise | m |
| $\lambda$ | Carrier wavelength | m |
| $\phi$ | Carrier phase observation | cycles |
| $n$ | Integer ambiguity | cycles |
| $\eta$ | Carrier observation noise | m |

FIG. 1B

SYSTEM AND METHOD FOR INTEGER-LESS GNSS POSITIONING

RELATED APPLICATION

This Application is related to co-filed application Ser. No. 16/789,455.

TECHNICAL FIELD

This invention relates generally to positioning systems, such as the global positioning system (GPS) or the Quasi-Zenith Satellite System (QZSS), and more particularly to resolving receiver positions and velocities without having to resolve integer ambiguities in carrier-phase measurements by receivers in such positioning systems.

BACKGROUND

A Global Navigation Satellite System (GNSS) is a system of satellites that can be used for determining the geographic location of a mobile receiver with respect to the earth. GNSS include GPS, Galileo, Glonass, QZSS, and BeiDou. Various global navigation satellite (GNS) correction systems are known that are configured for receiving GNSS signal data from the GNSS satellites, for processing these GNSS data, for calculating GNSS corrections from the GNSS data, and for providing these corrections to a mobile receiver, with the purpose of achieving quicker and more accurate calculation of the mobile receiver's geographic position.

Various position estimation methods are known wherein the position calculations are based on repeated measurement of the so-called pseudo range and carrier phase observables by Earth based GNSS receivers. The "pseudo range" or "code" observable represents a difference between transmit time of a GNSS satellite signal and local receive time of this satellite signal, and hence includes the geometric distance covered by the satellite's radio signal. In addition, measurement of the alignment between the carrier wave of the received GNSS satellite signal and a copy of such a signal generated inside the receiver provides another source of information for determining the apparent distance between the satellite and the receiver. The corresponding observable is called the "carrier phase", which represents the integrated value of the Doppler frequency due to the relative motion of the transmitting satellite and the receiver.

Any pseudo range observation comprises inevitable error contributions, among which are receiver and transmitter clock errors, as well as additional delays caused by the non-zero refractivity of the atmosphere, instrumental delays, multipath effects, and detector noise. Any carrier phase observation additionally comprises an unknown integer number of signal cycles, that is, an integer number of wavelengths, that have elapsed before a lock-in to this signal alignment has been obtained. This number is referred to as the "carrier phase ambiguity". Usually, the observables are measured i.e. sampled by a receiver at discrete consecutive times. The index for the time at which an observable is measured is referred to as an "epoch". The known position determination methods commonly involve a dynamic numerical value estimation and correction scheme for the distances and error components, based on measurements for the observables sampled at consecutive epochs.

For the reason of seemingly needing to determine the integer ambiguities for accurate GNSS positioning, most GNSS positioning systems work recursively in time and determine the receiver position in two steps, at each time step. First, the method resolves integer ambiguities of relevant carrier phase satellite signals. Then, based on the integer determined ambiguities, the receiver position and/or velocity can be determined.

For example, when GNSS signals are continuously tracked and no loss-of-lock occurs, the integer ambiguities resolved at the beginning of a tracking phase can be kept for the entire GNSS positioning span. The GNSS satellite signals, however, may be occasionally shaded (e.g., due to buildings in "urban canyon" environments), or momentarily blocked (e.g. when the receiver passes under a bridge or through a tunnel). Generally, in such cases, the integer ambiguity values are lost and must be re-determined. This process can take from a few seconds to several minutes. In fact, the presence of significant multipath errors or unmodeled systematic biases in one or more measurements of either pseudorange or carrier phase may make it difficult with present commercial positioning systems to resolve the ambiguities. As the receiver separation (i.e., the distance between a reference receiver and a mobile receiver whose position is being determined) increases, distance-dependent biases (e.g. orbit errors and ionospheric and tropospheric effects) grow, and, as a consequence, reliable ambiguity resolution (or re-initialization) becomes an even greater challenge. Furthermore, loss-of-lock can also occur due to a discontinuity in a receiver's continuous phase lock on a signal, which is referred to as a cycle slip. For instance, cycle slips can be caused by a power loss, a failure of the receiver software, or a malfunctioning satellite oscillator. In addition, cycle slip can be caused by changing ionospheric conditions.

Due to the involved two-step procedure in GNSS receiver positioning, standard estimation methods, e.g., variants of Kalman filters, particle filters, or nonlinear observers, cannot be straightforwardly used. Instead, they have to be devised and intertwined based on the particular method that is employed for the integer ambiguity resolution.

This has at least two side effects. First, the employed methods and resulting positioning systems become overly complex, which results in difficulties in understanding the systems. Second, the increased complexity results in unnecessarily complex software architectures needed for hosting the positioning systems.

Consequently, there is a need for a GNSS positioning system and method for allowing high-resolution GNSS receiver position estimation without resolving the integer ambiguities.

SUMMARY

It is an object of some embodiments to provide a method and a system for resolving carrier phase ambiguity in Global Navigation Satellite System (GNSSs). GNSS satellite measurements include so-called pseudo range and carrier phase observables by Earth based GNSS receivers. The "pseudo range" or "code" observable represents a difference between transmit time of a GNSS satellite signal and local receive time of this satellite signal, and hence includes the geometric distance covered by the satellite's radio signal. In addition, measurement of the alignment between the carrier wave of the received GNSS satellite signal and a copy of such a signal generated inside the receiver provides another source of information for determining the apparent distance between the satellite and the receiver. The corresponding observable is called the "carrier phase", which represents the integrated value of the Doppler frequency due to the relative motion of the transmitting satellite and the receiver.

In general, a GNSS can use multiple constellations at the same time to determine the receiver state. For example, GPS, Galileo, Glonass, and QZSS can be used concurrently. Satellite systems typically transmit information at up to three different frequency bands, and for each frequency band, each satellite transmits a code measurement and a carrier-phase measurement. These measurements can be combined as either single differenced or double differenced, wherein a single difference includes taking the difference between a reference satellite and other satellites, and wherein double differencing includes differencing also between the receiver of interest and a base receiver with known static location.

In general, accurate carrier-phase integer ambiguity resolution is fundamental for high precision GNSSs, but it increases complexity of the positioning system since it necessitates the need for hybrid estimation strategies, where integer components, ambiguities, are mixed with float values, the receiver position. It is an object of some embodiments to disclose a method for resolving the ambiguities as float values, hence reducing complexity of the estimation procedure used for GNSS positioning.

To remove the need for integer ambiguity estimation, one embodiment realizes that a weighted combination of integers becomes a float value. For instance, a third of one integer in addition to two thirds of another integer is typically not an integer. Hence, one embodiment is based on the recognition that a combination of fractions of different measurements and associated measurement models enables estimating the ambiguity as a float value, which is computationally easier than determining a set of integer values. This is because the float values ambiguities can be directly incorporated into various probabilistic state estimators, such as Kalman filters, without the need to use the two-step procedure that first determines the integer ambiguities in the carrier signals and only after that executes a Kalman filter.

Additionally, or alternately, it is an object of some embodiments to provide a measurement model suitable for utilization in probabilistic state estimators, such as position estimation filters, providing state estimates based on a motion model and a measurement model. The position estimation filters can be advantageous, because the ambiguity resolution is typically only an intermediate step in position estimation, not the ultimate objective. One embodiment is based on the recognition that by providing a measurement model suitable for probabilistic state estimation filters, e.g., Kalman filters and particle filters, the positioning system can be built without an integer ambiguity resolution component.

The measurements of different combination of satellites can be represented as a measurement matrix. Each element of a matrix is a single or double differenced measurement of at least one unique pair of satellites and/or receivers. Different satellites and/or receivers can be grouped in different pairs to increase dimensionality of the measurement matrix. Each measurement carries information that can be used for position estimation. To that end, it can be possible to use the measurement matrix in its entirety for position estimation. However, in some situations, the dimensionality of the measurement matrix caused by availability of line-of-sight (LOS) satellites for the tracked GNSS receiver prohibitively increases computational complexity of position estimation filters.

Some embodiments are based on recognition that only a portion of all available measurements from measurement matrix can be used in state estimators. Typically, measurements from at least four LOS satellites are needed for accurate position estimation. Because the measurement matrix includes measurements representing a pair of satellites, at least two elements of the measurement matrix are needed for position estimation. To that end, it is possible that any two elements of the matrix can be selected. Such a selection can be random or following some selection principle. Examples of such a principle include selecting randomly a single satellite and collecting a predetermined number of measurements of differences between the selected satellite and other LOS satellites. However, such an approach can be suboptimal from an information quality point of view.

Some embodiments are based on recognition that different elements of measurement matrix can have different informational value to the position estimation filter. As an illustrative example, a pair of satellite positions on the same LOS with respect to the GNSS receiver has less informative value than a pair of satellites positioned on different LOS. This is because they provide the same geometric information of the receiver.

Accordingly, different measurements in the measurement matrix carry different amount of information about position of the GNSS receiver. Some embodiments are based on realization that it is possible to select a predetermined number of measurements with maximum total information about the position. Because the number of selected measurements is predetermined from computational point of view, but the measurements are selected from available measurements based on informative value point of view, the selected combination improves the accuracy of position estimation without sacrificing its performance.

For example, some embodiments utilize the Fisher information matrix to project the acquired measurements into a lower-dimensional subspace, formulating an optimization program to find the projected measurement that minimally degrades filter performance with respect to the mean squared error (MSE) of the estimate. Using the projected measurements achieves a significant computational speedup while retaining the performance of the original filter.

Another embodiment is based on the understanding that from an algorithmic standpoint, the combination of satellites does not have to include full satellites. For instance, consider the case of having four satellites. Then, it may be better to use a fourth of the measurement of the first satellite and three fourths of the fourth satellites, than to combine full satellite measurements. In other words, the combination of satellite measurements forming a measurement is a noninteger combination of satellites. Intuitively, this is because the Fisher information captures the uncertainty in the system, and although a combination of full satellites has highest probability, since there is some uncertainty about the correctness of such combination, it is safer from an MSE standpoint to choose noninteger combinations.

An example of a probabilistic state estimator is a Kalman filter, which uses a series of measurements observed over time, containing statistical noise and other inaccuracies, and produces estimates of unknown variables that tend to be more accurate than those based on a single measurement alone, by estimating a joint probability distribution over the variables for each timeframe. The Kalman filter keeps track of the estimated state of the system and the uncertainty of the estimate. The estimate is updated using motion model of state transitions and the measurements. Some embodiments use a Kalman filter-based system with a motion model subject to process noise of a GNSS receiver and a measurement model of satellite signals subject to measurement noise, wherein the measurement model is a weighted combination of a subset of measurements from the set of measurements, such that the integers when combined become float values.

Accordingly, one embodiment discloses a system for tracking a state of a receiver of a global navigational satellite system (GNSS), that includes an input interface to accept motion data indicative of a change of a state of the receiver and measurements of satellite signals including a combination of carrier signals and code signals transmitted from a set of GNSS satellites, wherein a measurement for each satellite signal includes at least a single difference measurement of a satellite signal to represent a relative position of the receiver of the satellite signal with respect to a position of a satellite transmitting the satellite signal subject to integer ambiguity of the carrier signal of the satellite and noise, such that all possible measurements for each satellite signal at a current time step form a set of measurements; a memory configured to store a motion model transitioning a previous state of the receiver to a current state of the receiver according to the motion data, wherein the motion model is a probabilistic model subject to process noise, to store a measurement model relating a subset of the measurements of satellite signals to the current state of the receiver, wherein the size of the subset of measurements is less than the size of the set of measurements, and wherein the measurement model is a probabilistic model subject to measurement noise, and to store a state estimator configured to track the state of the receiver using a joint probability of the state of the receiver estimated by the motion model and the measurement model; and a processor to track the state of the receiver, the processor is configured to select the subset of measurements, wherein each measurement in the subset of measurements is formed by a weighted combination of multiple different measurements from the set of measurements; and execute the state estimator with the motion model using the motion data and the measurement model using the selected subset of measurements to estimate the state of the receiver.

Another embodiment discloses a method for tracking a state of a receiver of a global navigational satellite system (GNSS), wherein the method uses a processor coupled to a memory storing a motion model transitioning a previous state of the receiver to a current state of the receiver according to the motion data, wherein the motion model is a probabilistic model subject to process noise, and a measurement model relating a subset of the measurements of satellite signals to the current state of the receiver, and wherein the measurement model is a probabilistic model subject to measurement noise, and a state estimator configured to track the state of the receiver using a joint probability of the state of the receiver estimated by the motion model and the measurement model, wherein the processor is coupled with stored instructions implementing the method, wherein the instructions, when executed by the processor carry out steps of the method, that includes accepting motion data indicative of a change of a state of the receiver; accepting measurements of satellite signals including a combination of carrier signals and code signals transmitted from a set of GNSS satellites, wherein a measurement for each satellite signal includes a single difference between the satellite signal transmitted by a satellite and another satellite signal to include a relative position of the receiver of the satellite signal with respect to a position of the satellite subject to integer ambiguity of the carrier signal of the satellite and noise, such that all possible measurements for each satellite signal form a set of measurements; selecting the subset of measurements, wherein each measurement in the subset of measurements is formed by a weighted combination of multiple different measurements from the set of measurements; and executing the state estimator with the motion model using the motion data and the measurement model using the selected subset of measurements to estimate the state of the receiver.

Yet another embodiment discloses a non-transitory computer readable storage medium embodied thereon a program executable by a processor for performing a method, wherein the medium stores a motion model transitioning a previous state of the receiver to a current state of the receiver according to the motion data, wherein the motion model is a probabilistic model subject to process noise, and a measurement model relating a subset of the measurements of satellite signals to the current state of the receiver, and wherein the measurement model is a probabilistic model subject to measurement noise, and a state estimator configured to track the state of the receiver using a joint probability of the state of the receiver estimated by the motion model and the measurement model, the method includes accepting motion data indicative of a change of a state of the receiver; accepting measurements of satellite signals including a combination of carrier signals and code signals transmitted from a set of GNSS satellites, wherein a measurement for each satellite signal includes a single difference between the satellite signal transmitted by a satellite and another satellite signal to include a relative position of the receiver of the satellite signal with respect to a position of the satellite subject to integer ambiguity of the carrier signal of the satellite and noise, such that all possible measurements for each satellite signal form a set of measurements; selecting the subset of measurements, wherein each measurement in the subset of measurements is formed by a weighted combination of multiple different measurements from the set of measurements; and executing the state estimator with the motion model using the motion data and the measurement model using the selected subset of measurements to estimate the state of the receiver.

BRIEF DESCRIPTION OF THE DRAWINGS

FIG. 1B shows the various variables that are used alone or in combination in the modeling of the motion and/or measurement model according to some embodiments.

DETAILED DESCRIPTION

Figure 1A:
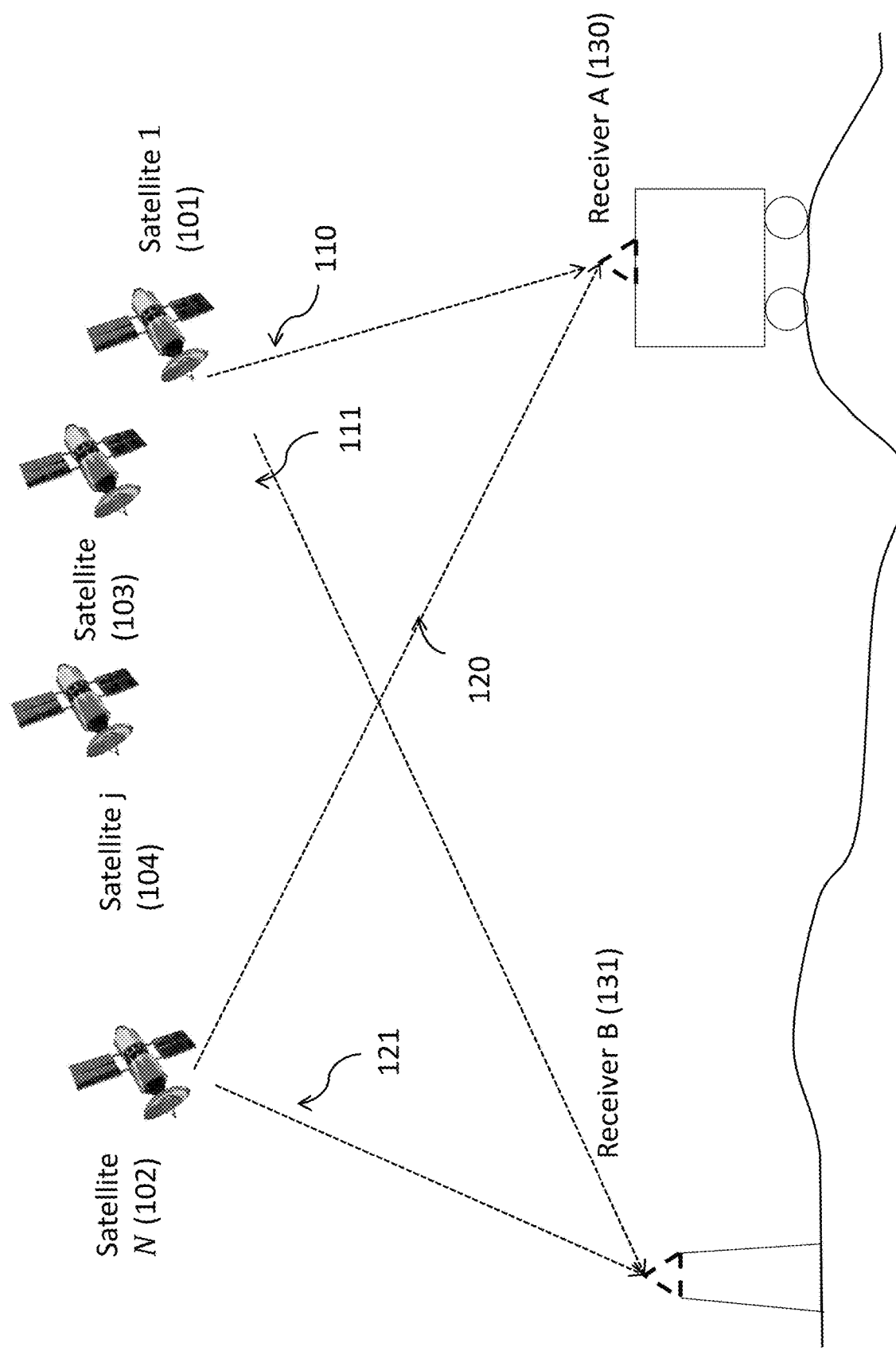
FIG. 1A shows a schematic of a global navigation satellite system (GNSS) according to some embodiments.

FIG. 1A shows a schematic of a global navigation satellite system (GNSS) according to some embodiments. For instance, the Nth satellite 102 transmits 120 and 121 code and carrier phase measurements to a set of receivers 130 and 131. For example, the receiver 130 is positioned to receive signals 110, 120, from N satellites 101, 103, 104, and 102. Similarly, the receiver 131 is positioned to receive signal 121 and 111 from the N satellites 101, 103, 104, and 102.

In various embodiments, the GNSS receiver 130 and 131 can be of different types. For example, in exemplar embodiment of FIG. 1A, the receiver 131 is a base receiver, whose position is known. For instance, the receiver 131 can be a receiver mounted on the ground. In contrast, the receiver 130 is a mobile receiver configured to move. For instance, the receiver 130 can be mounted in a cell phone, a car, or a train. In some implementations, the second receiver 131 is optional and can be used to remove uncertainties and errors due to various sources, such as atmospheric effects and errors in the internal clocks of the receivers and satellites.

It is an objective of some embodiments to disclose a method for reducing complexity of the estimation procedure used for ambiguity resolution. Additionally, or alternately, it is an objective of some embodiments to provide an ambiguity resolution method suitable for utilization in state estimators, wherein the ambiguities are lower-dimensional projections of the original ambiguities, and wherein the ambiguities are determined as float values, not integer values, and wherein the filters are probabilistic filters such as state estimation filters, providing state estimates based on a motion model and a measurement model. The state estimation filters can be advantageous, because the ambiguity resolution is typically only an intermediate step in position estimation, not the ultimate objective.

An example of a state estimator is a Kalman filter, which uses a series of measurements observed over time, containing statistical noise and other inaccuracies, and produces estimates of unknown variables that tend to be more accurate than those based on a single measurement alone, by estimating a joint probability distribution over the variables for each time frame. The Kalman filter keeps track of the estimated state of the system and the uncertainty of the estimate. The estimate is updated using motion model of state transitions and the measurements. Some embodiments use a Kalman filter-based system with a motion model subject to process noise of a GNSS receiver and a measurement model of satellites signals subject to measurement noise.

In some embodiments, the model of the motion of the receiver is a general-purpose kinematic constant-acceleration model with the state vector $x_k = [p_{r,k} \ v_{r,k} \ a_{r,k}]^T$, where the three components are the position, velocity, and acceleration of the receiver. In some other embodiments, the time evolution of the ambiguity is modeled as $n_{k+1} = n_k + w_{n,k}$, $w_{n,k} \sim \mathcal{N}(0, Q_n)$, where $n_{k+1}$ is the ambiguity and $w_{n,k}$ is the Gaussian process noise with covariance $Q_n$.

Some embodiments capture the carrier and code signals in the measurement model $\mathcal{Y}_k = h_k + \lambda \bar{n}_k + e_k$, where $e_k$ is the measurement noise, h is a nonlinear part of the measurement equation dependent on the position of the receiver, n is the integer ambiguity, λ is a wavelength of the carrier signal, and y is a single or double difference between a combination of satellites K.

In some embodiments, the probabilistic filter uses the carrier phase single difference (SD) and/or double difference (DD) for estimating a state of the receiver indicating a position the receiver. When a carrier signal transmitted from one satellite is received by two receivers the difference between the first carrier phase and the second carrier phase is referred as the single difference (SD) in carrier phase. Alternatively, the SD can be defined as the difference between signals from two different satellites reaching a receiver. For example, the difference can come from a first and a second satellites when the first satellite is called the base satellite. For example, the difference between signal 110 from satellite 101 and signal 120 from satellite 102 is one SD signal, where satellite 101 is the base satellite. Using pairs of receivers, 131 and 130 in FIG. 1A, the difference between SDs in carrier phase obtained from the radio signals from the two satellites is called the double difference (DD)

in carrier phase. When the carrier phase difference is converted into the number of wave length, for example, λ=19 cm for L1 GPS (and/or GNSS) signal, it is separated by fractional and integer parts. The fractional part can be measured by the positioning apparatus, whereas the positioning device is not able to measure the integer part directly. Thus, the integer part is referred to as integer bias or integer ambiguity.

In general, a GNSS can use multiple constellations at the same time to determine the receiver state. For example, GPS, Galileo, Glonass, and QZSS can be used concurrently. Satellite systems typically transmit information at up to three different frequency bands, and for each frequency band, each satellite transmits a code measurement and a carrier-phase measurement. These measurements can be combined as either single differenced or double differenced, wherein a single difference includes taking the difference between a reference satellite and other satellites, and wherein double differencing includes differencing also between the receiver of interest and a base receiver with known static location.

FIG. 1B shows the various variables that are used alone or in combination in the modeling of the motion and/or measurement model according to some embodiments. Some embodiments model the carrier and code signals for each frequency with the measurement model $$P_k^j = \rho_k^j + c(\theta t_{r,k} - \delta t_k^j) + I_k^j + T_k^j + \varepsilon_k^j, \quad (1)$$

$$\Phi_k^j = \rho_k^j + c(\delta t_{r,k} - \delta t_k^j) - I_k^j + T_k^j + \lambda n^j + \eta_k^j, \quad (2)$$

where $P^j$ is the code measurement $\rho^j$ is the distance between the receiver and the j th satellite, c is the speed of light, $\delta t_r$ is the receiver clock bias, $\delta t^j$ is the satellite clock bias, $I^j$ is the ionospheric delay, $T^j$ is the tropospheric delay, $\varepsilon^j$ is the probabilistic code observation noise, $\Phi^j$ is the carrier-phase observation, $\lambda$ is the carrier wavelength, $n^j$ is the integer ambiguity, and $\eta^j$ is the probabilistic carrier observation noise.

In one embodiment, the original measurement model is transformed by utilizing a base receiver b mounted at a known location broadcasting to the original receiver r, most of the sources of error can be removed. For instance, one embodiment forms the difference between the two receivers 130 and 131 in FIG. 1A as $\Delta P_{br,k}^j = P_{b,k}^j - P_{r,k}^j$ and $\Delta \Phi_{br,k}^j = \Phi_{b,k}^j - \Phi_{r,k}^j$, from which the error due to the satellite clock bias can be eliminated. Another embodiment forms a double difference between two satellites j and l. Doing in such a manner, clock error terms due to the receiver can be removed. Furthermore, for short distances between the two receivers (e.g., 30 km), the ionospheric errors can be ignored, leading to $\nabla \Delta P_{br,k}^{jl} \approx \nabla \Delta \rho_{br,k}^{jl} + \nabla \Delta \varepsilon_{br,k}^{jl}$, $\nabla \Delta \Phi_{br,k}^{jl} \approx \nabla \Delta \rho_{br,k}^{jl} + \lambda \nabla \Delta n_{br}^{jl} + \nabla \Delta \eta_{br,k}^{jl}$. Alternatively, one embodiment forms the difference between two satellites 101 and 102, leading to SD measurements.

Figure 1C:
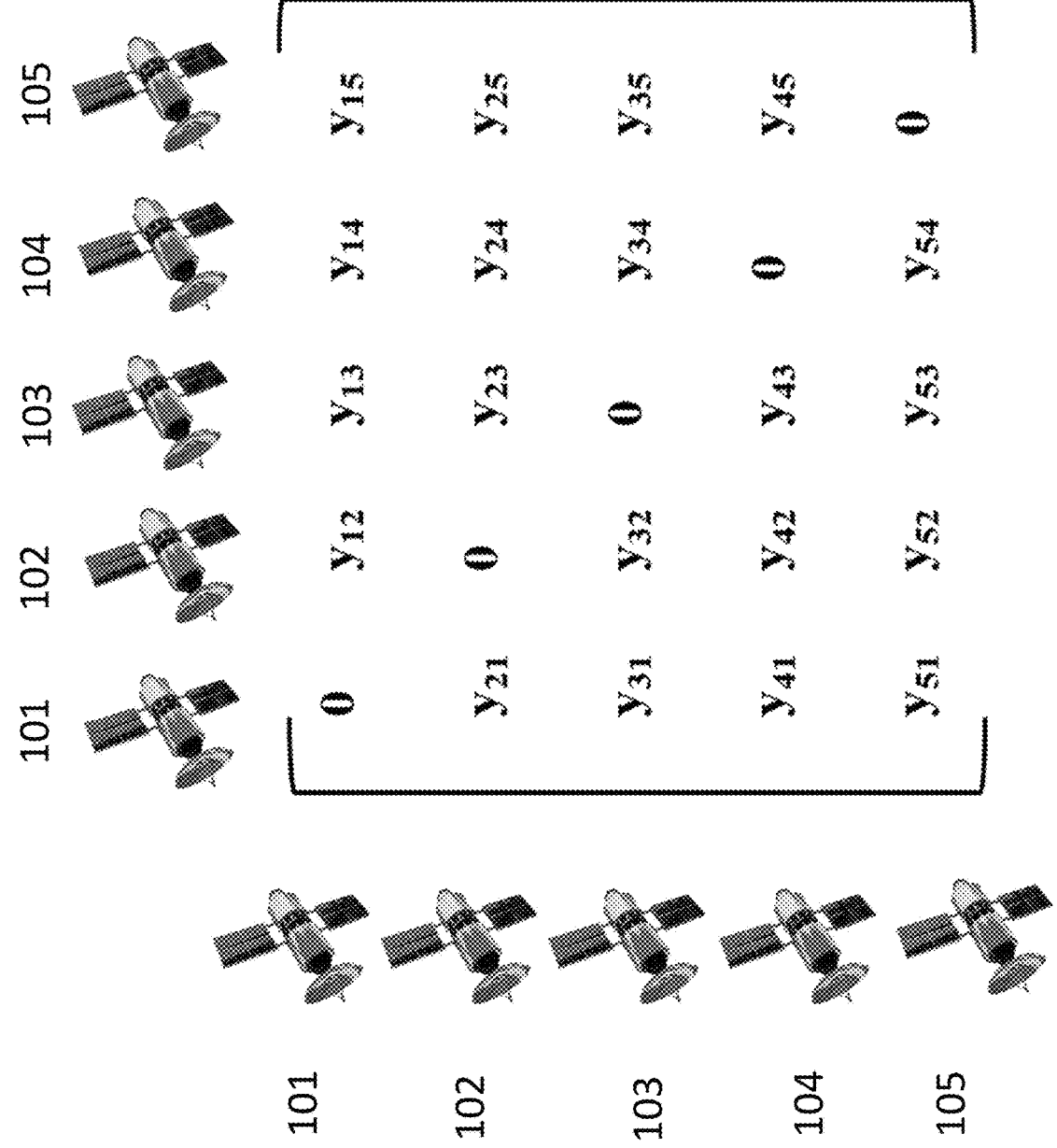
FIG. 1C shows an example of the combinations of SD that can be formed for one frequency between satellites when there are five satellites in line-of-sight (LOS).

For satellites shown in FIG. 1A, the SD and DD can be formed between any combination of satellites. FIG. 1C shows an example of the combinations of SD that can be formed for one frequency between satellites when there are five satellites in line-of-sight (LOS). The measurements of different combinations of satellites can be represented as the matrix in FIG. 1A. Each element of the matrix is an SD or DD measurement of at least one unique pair of satellites and/or receivers. Different satellites can be grouped in different pairs to increase dimensionality of the measurement matrix. Each measurement $y_{ij}$ carries information that can be used for position estimation. To that end, it can be possible to use the measurement matrix in its entirety for position estimation. For example, using the satellite 101 as base receiver, SD measurements $y_{12}$, $y_{13}$, $y_{14}$, and $y_{15}$ can be formed. Similarly, using satellite 102 as base satellite, the corresponding SDs are $y_{21}$, $y_{23}$, $y_{24}$, and $y_{25}$. Generally, for M satellites and N frequencies there are (M−1)NM/2 possible combinations.

Some embodiments recognize that using all possible measurements of the measurement matrix can be computationally prohibitive for computationally limited receivers. In other words, in some situations, the dimensionality of the measurement matrix caused by availability of LOS satellites for the tracked GNSS receiver prohibitively increases computational complexity of position estimation filters. For instance, if there are multiple integer ambiguities that give good state estimation, it can be advantageous to execute multiple state estimators. As illustration, assume that there are M=10 unique pairs of code and carrier phase measurements, with five possible ambiguities that give good state estimation. This requires $N_S = 5^M \approx 10^7$ state estimators to be executed in parallel. Hence, the computations can be overwhelming for a low-cost receiver.

Figure 1D:
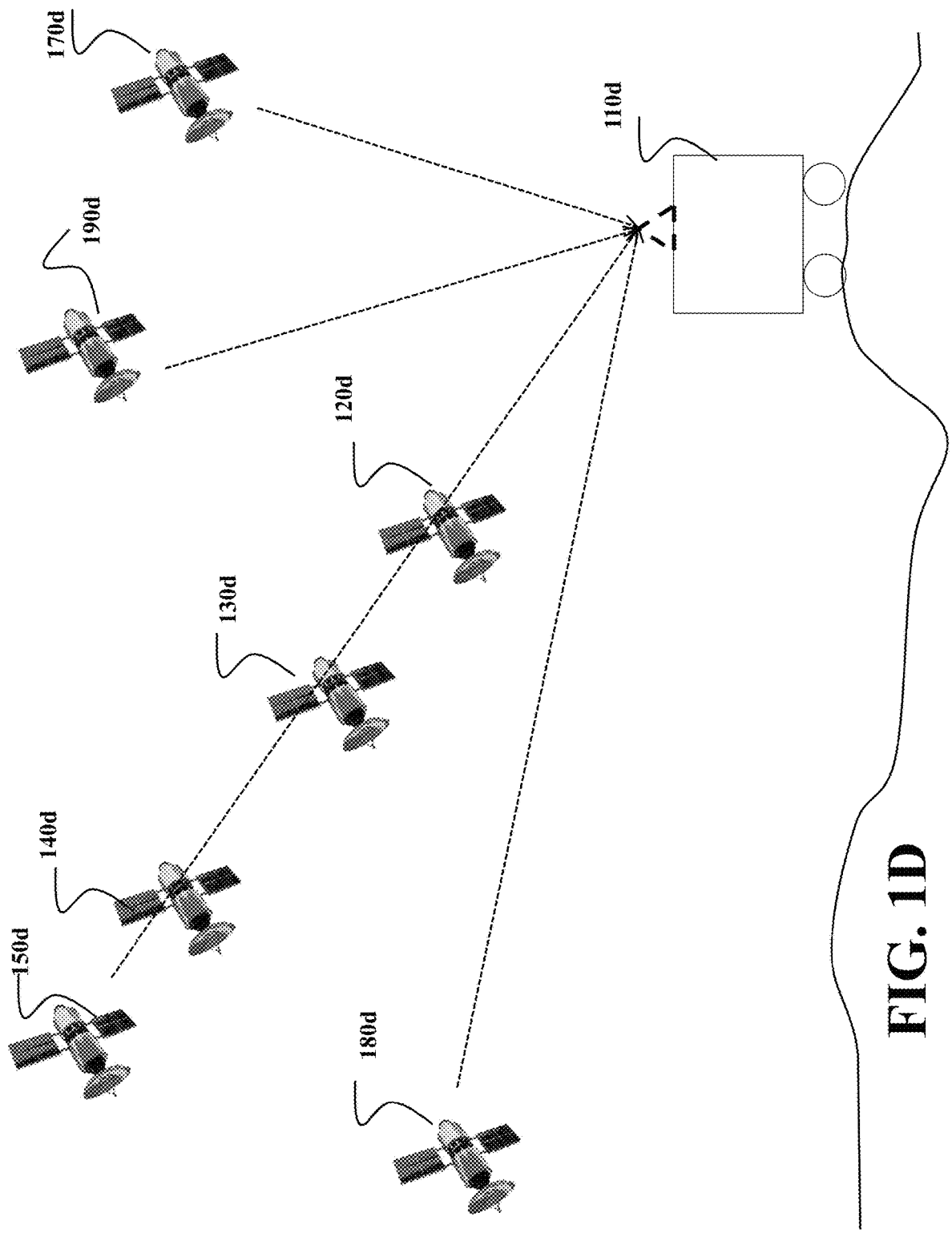
FIG. 1D shows an example of recognitions of different embodiments of the invention.

Some embodiments are based on recognition that different elements of the measurement matrix can have different informational value to the position estimation filter. For example, a pair of satellite positions on the same LOS with respect to the GNSS receiver has less informative value than a pair of satellites positioned on different LOS. This is because they provide the same geometric information of the receiver. FIG. 1D shows an example of recognitions of different embodiments of the invention. The figure shows a receiver 110d and seven satellites 120d through 190d. Assume that four satellites are to be used in the state estimator, e.g., a KF. Satellites 120d, 130d, 140d, and 150d are located on the same line from the receiver 110e. They provide different distance measurements but from the same elevation angle, meaning that they have equal sensitivity to measurement noise. i.e., noise in the position measurement of the receiver. However, satellites 170d, 180d, and 190d have different elevation angles, meaning that measurement noise affects the uncertainties of receiver position differently. Hence, different satellites provide different information about the receiver position.

Figure 1E:
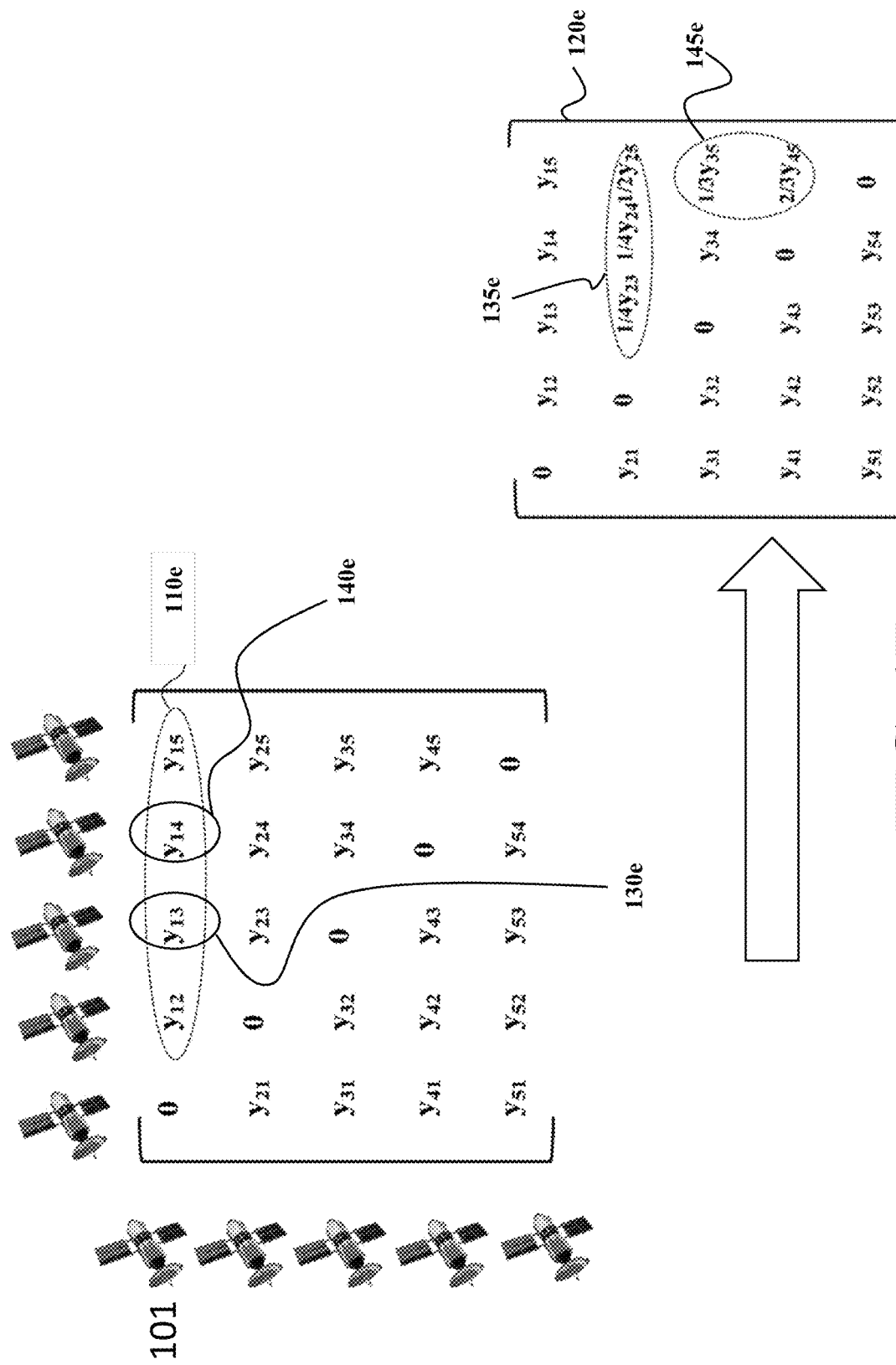
FIG. 1E shows an illustration of conventional selection of measurements according to one embodiment.

Typically, in GNSS the base satellite to use in the SD is the satellite with the highest elevation angle, because that satellite is likely to not have obstructions from multipath. Referring to FIG. 1E, if satellite 101 has the highest elevation angle, this means that the set 110e of measurements $y_{12}$, $y_{13}$, $y_{14}$, and $y_{15}$ are the measurements used in the estimation. However, some embodiments are based on the understanding that there are multiple factors determining which satellite to use as base satellite, e.g., the physical positions and environmental disturbances of the satellites. Referring again to FIG. 1D, satellite 190d has the highest elevation angle of all the satellites. Hence, it is natural to form the SD as the difference between 190d and the other satellites and choose four SD measurements to use in the state estimator. However, instead it can be advantageous to form SD measurements using different satellites as base satellites, because it provides more geometric diversity among satellites.

Some embodiments are based on the realization that it is possible to select a predetermined number of measurements with maximum total information about the position. Because the number of selected measurements is predetermined from computational point of view, but the measurements are selected from available measurements based on informative value point of view, the selected combination provides maximum accuracy of state estimation while obeying the computational limitations of the receiver hardware.

One embodiment is based on the understanding that to remove the need for integer ambiguity resolution, the combination of satellites should be fractions of satellites. For instance, consider the case of having five satellites as in FIG. 1A and FIG. 1C. Then, to remove the integer ambiguities it is possible to use a fourth of the measurement of the first satellite and three fourths of the fourth satellites. In other words, the combination of satellite measurements forming a measurement is a noninteger combination of satellites. Intuitively, this is because the sum of fractions of different integers is not an integer.

Referring back to FIG. 1E, in this example, measurements of matrix 110e is represented as weighted combinations of different measurements 120e. For example, a measurement 130e is replaced with a weighted combination 135e, while a measurement 140e is replaced with a weighted combination 145e. In some implementations, the weighted combination of different measurements is a combination such that all weights sum to one. Doing such normalizations can be beneficial when implementing on embedded hardware with finite numerical precision.

In some embodiments, the measurements are transformed into a lower-dimensional subspace, i.e., the measurement model contains fewer equations, by using a projection operator that projects the set of measurements onto a subset of measurements. In one embodiment, the projection operator is linear and projects a set of measurements $y_k$ onto a subset of measurements $\tilde{y}_k$, by the linear map $\tilde{y}_k = \mathcal{P}_k y_k$. This leads to a transformation of the original measurements into a measurement model $\mathcal{P}_k(h(x_k) + \lambda G n_k + e_k) = \mathcal{P}_k h(x_k) + \mathcal{P}_k \lambda G n_k + \mathcal{P}_k e_k$. In other words, the projection operator maps the set of measurements onto a subset of measurements, wherein the subset of measurements do not have the ambiguity as integers.

Figure 1F:
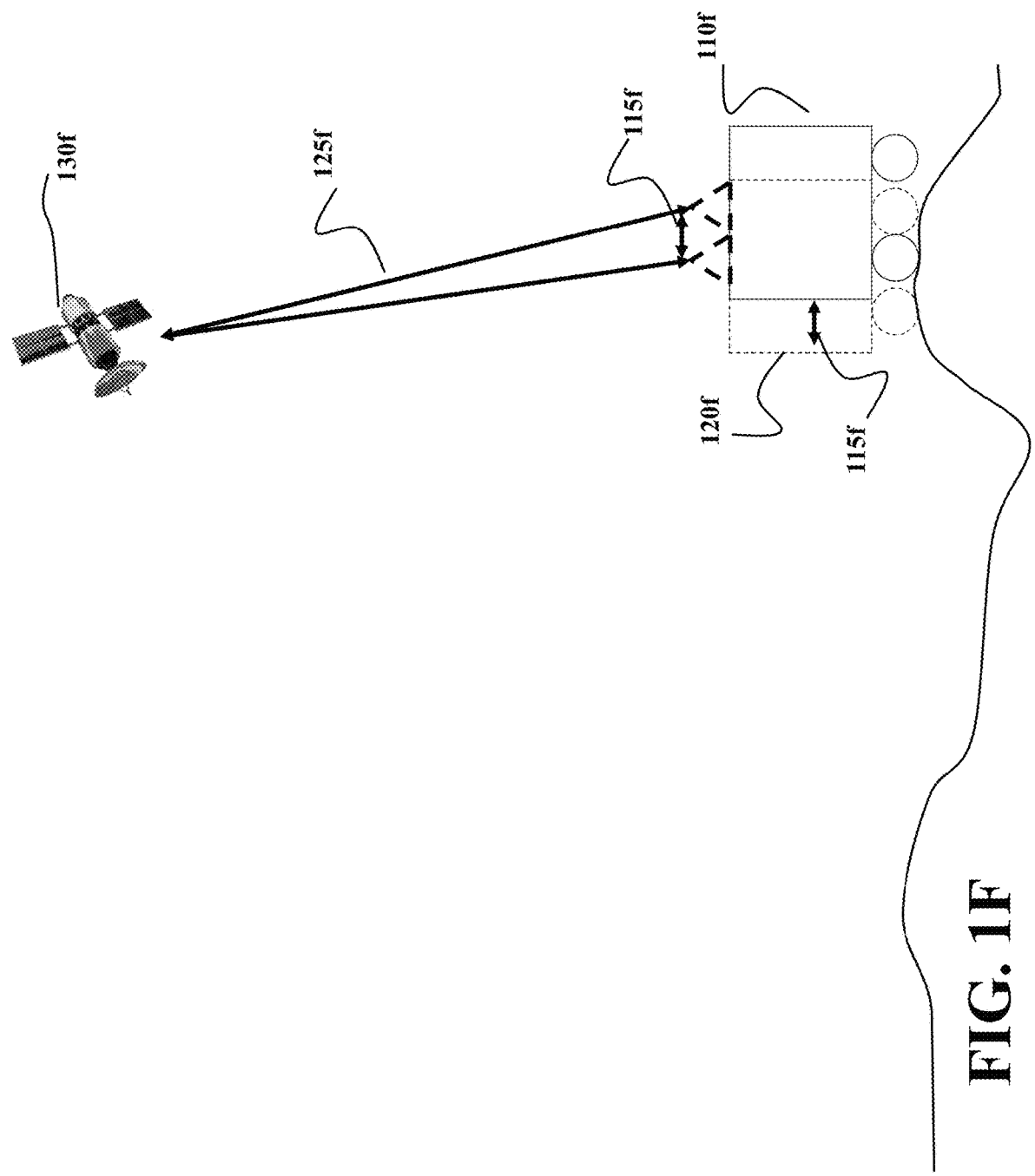
FIG. 1F shows an illustration of a recognition of one embodiment of using coarse position of receiver to determine the information of measurement of a satellite

The position of the receiver is part of the state of the receiver, which is unknown and estimated by the state estimator, e.g., a KF. A state estimator by nature produces a small error in state information. To that end, some embodiments are based on that the recognition that to determine the information of measurements, it is enough to know a coarse position of the receiver. FIG. 1F shows an illustration of a recognition of one embodiment of using coarse position of receiver to determine the information of measurement of a satellite 130f. The receiver is located at position 110f, but the measurements result in a position estimation error of 115f, implying that the state estimator believes that the receiver is located at position 120f. However, this error is substantially smaller than the distance 125f between the receiver 110f and satellite 130f. Hence, the determining of the information of measurements using satellite 130f is insensitive to the use of a coarse knowledge of the actual position of the receiver.

Some embodiments are based on the recognition that it is possible to use the projection operator to transform the integer ambiguities from a high-dimensional integer space to a lower-dimensional projected space of real-valued numbers.

Figure 1G:
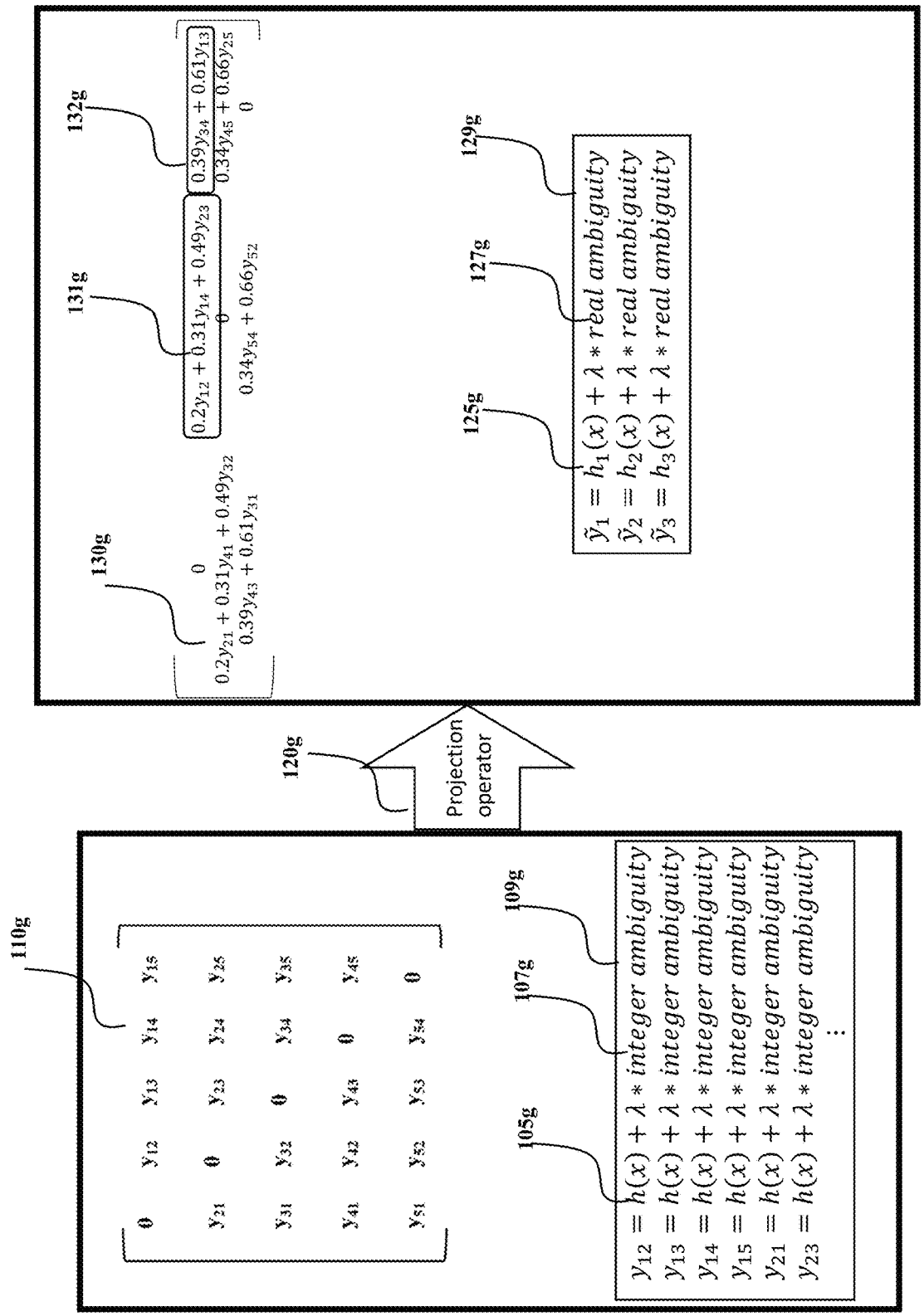
FIG. 1G shows an illustration of how the projection operator maps the high-dimensional set of measurements

FIG. 1G shows an illustration of how the projection operator maps the high-dimensional set of measurements, wherein the measurements include an integer ambiguity for each measurement, into a lower-dimensional subset of measurements, wherein the measurements include a real-valued ambiguity 127g for each measurement in the subset 129g of measurements. Initially, the measurement matrix 110g leads to a set of measurements 109g with the ambiguities 107g for the different measurements as integers, with one part 105g of the measurement model dependent on the receiver state. The projection operator maps 120g the measurements 109g in the measurement matrix 110g to a lower-dimensional measurement space, i.e., to fewer measurements 129h, wherein the measurements 129g in the measurement matrix 130g are weighted combinations of the original set of measurements 110g. Examples of weighted combinations are 131g and 132g. The modified measurements 129g contain a part 125g dependent on the receiver state and an ambiguity 127g which unlike 107g is not represented as an integer.

In some embodiments, the weights of the weighted combinations 131g and 132g of different measurements forming a measurement in the subset of measurements are selected such that the weighted combination of integer ambiguities of the different measurements is not an integer value. Specifically, the weights are selected such that for any values of integer ambiguities in measurements $y_{12}$, $y_{14}$, and $y_{23}$ in the example 131g, the resulting weighted combination of these integer ambiguities is guaranteed not being an integer. For example, in one embodiment, the weights of the weighted combination of different measurements are selected according to an optimization problem, wherein the objective is to minimize the loss of information in the subset of measurements relative to the full set of measurements, wherein the weights can take any value. Doing in such a manner ensures that the weights are not integers, since for any combination of measurements of more than one measurement, it is suboptimal to restrict the values to integers.

Figure 2A:
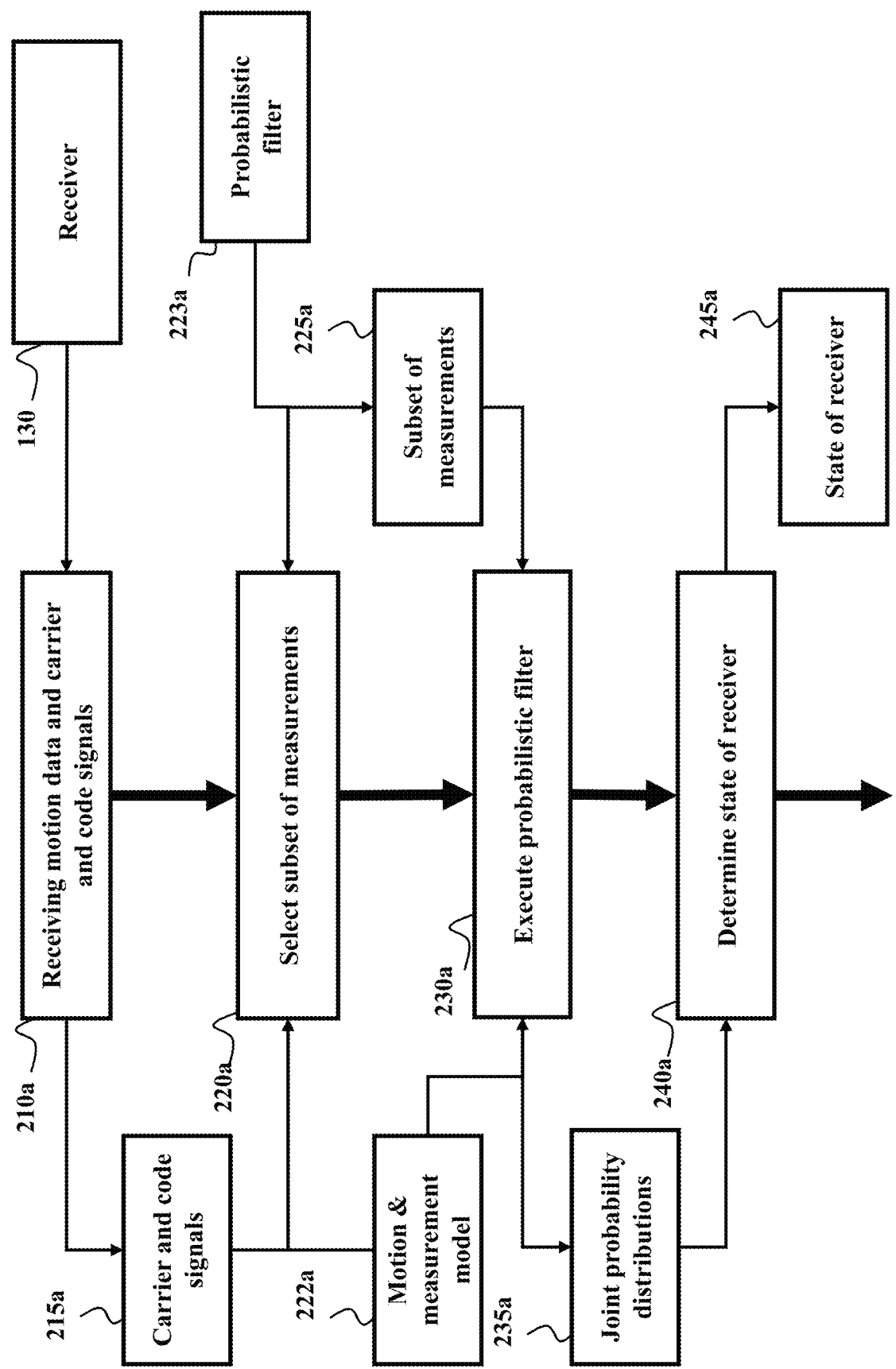
FIG. 2A shows a flowchart of one iteration of a method for tracking a state of a, possibly moving, receiver.

FIG. 2A shows a flowchart of one iteration of a method for tracking a state of a, possibly moving, receiver 130 using a GNSS configured to receive 210a motion data and measurements of satellite signals including a combination of carrier signals and code signals transmitted from a set of GNSS satellites 101, 102, 103, 104 according to some embodiments. Each measurement in the measurement model is a weighted combination of satellite signals, wherein each satellite signal includes a single difference between the satellite signal transmitted by a satellite and another satellite signal to include a relative position of the receiver of the satellite signal with respect to a position of the satellite, wherein each carrier signal includes a carrier phase ambiguity as an unknown integer number of wavelengths of the carrier signal travelled between the satellite 101, 102, 103, or 104 and the receiver 130 and noise, such that the weighted combination of satellite signals includes a subset of all possible measurements for each satellite signal.

The method retrieves 222a from a memory a probabilistic motion model subject to process noise relating a previous state of the receiver to a current state of the receiver and a probabilistic measurement model subject to measurement noise relating a weighted combination of subset of the measurements of satellite signals 215a to the current state of the receiver using the carrier phase ambiguities of the carrier signals. The maximum size of the subset of measurements is predetermined and fixed. The method also retrieves 223a a probabilistic filter configured to track the state of the receiver using a joint probability of the state of the receiver estimated by the probabilistic motion model and the probabilistic measurement model.

Next, the method executes 230a the probabilistic filter with the probabilistic motion model 222a using the motion data, the previous state of the receiver, and the probabilistic measurement model 222a using the selected subset 225a of measurements, to determine a joint probability distribution 235a of the state of the receiver using the probabilistic motion model and probabilistic measurement model, and determine 240*a* the state of the receiver 245*a* from the joint distribution 235*a*.

Figure 2B:
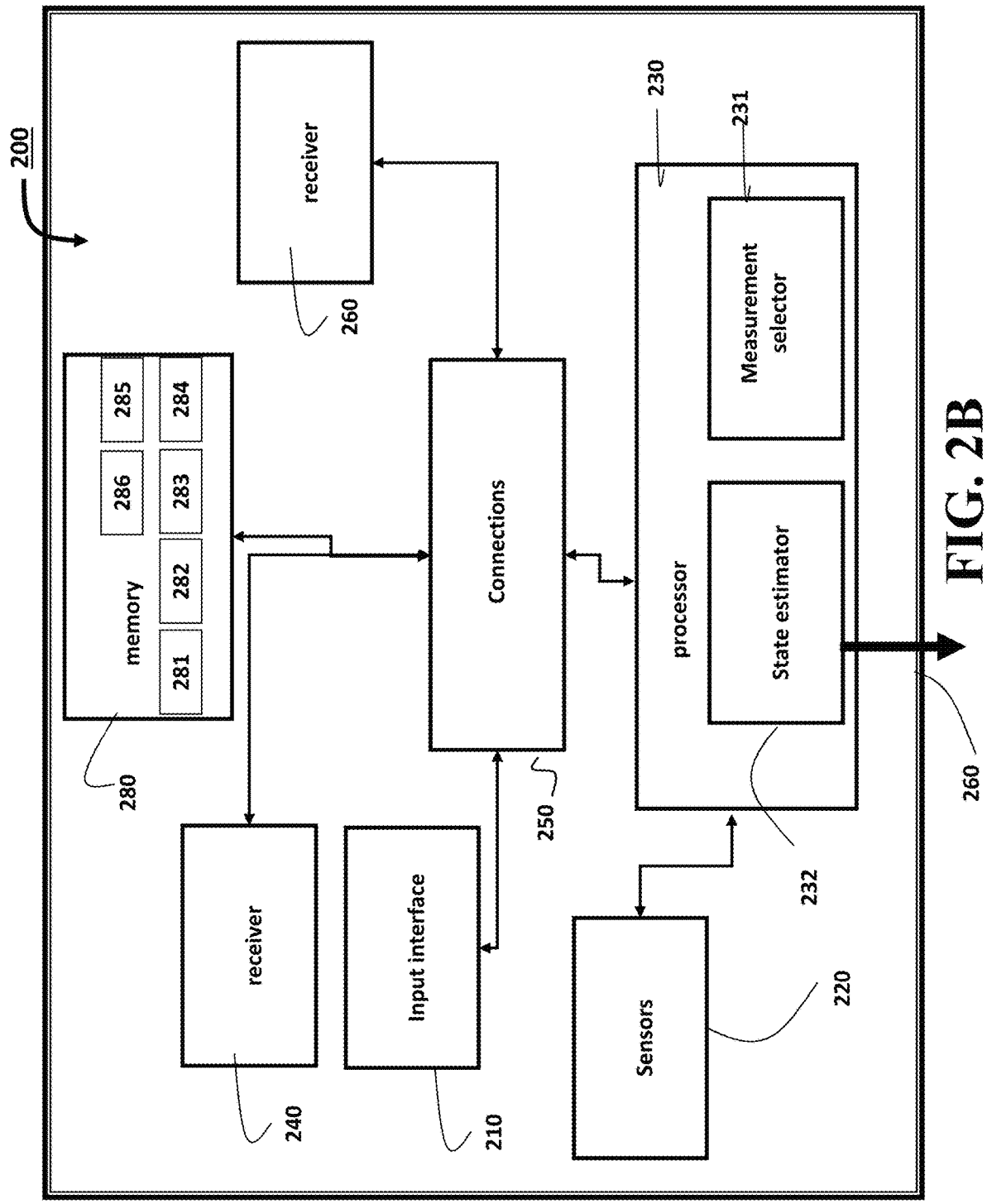
FIG. 2B shows a block diagram of a system for tracking of a state of a receiver of a GNSS according to some embodiments.

FIG. 2B shows a block diagram of a system 200 for tracking of a state of a receiver of a GNSS according to some embodiments. The state estimation system 200 includes an input interface 210 to accept motion data indicative of a change of a state of the receiver and measurements of satellite signals, i.e., carrier signals and code signals transmitted from a set of GNSS satellites, each carrier signal includes a carrier phase ambiguity as an unknown integer number of wavelengths of the carrier signal travelled between the satellite and the receiver, wherein a measurement for each satellite signal includes a single difference between the satellite signal transmitted by a satellite and another satellite signal to include a relative position of the receiver of the satellite signal with respect to a position of the satellite subject to integer ambiguity of the carrier signal of the satellite and noise, such that all possible measurements for each satellite signal form a set of measurements. The system 200 can be implemented internal to a number of devices on which the receiver 240 is located, such as handheld devices, cars, airplanes, or trains. Additionally, or alternatively, the system 200 can be communicatively connected to the device, i.e., the receiver 240 is not physically inside the system.

The system also includes a memory 280 storing a probabilistic motion model 281 relating a previous state of the receiver to a current state of the receiver, wherein the probabilistic motion model is subject to process noise, and a probabilistic measurement model 282 relating measurements of the carrier and code signals received by the receiver 240 to the current state of the receiver using the carrier phase ambiguities of the carrier signals, wherein the measurement model relates a subset of the measurements of satellite signals to the current state of the receiver, wherein the maximum size of the subset of measurements is predetermined and fixed, and wherein the measurement model of the subset of measurements that does not have the ambiguity as an integer is a probabilistic model subject to measurement noise. Due to the inherent random noise and errors of the satellite transmitter and receiver 210, the motion model and the measurement model are probabilistic, thus allowing a continuum of possible values of the carrier phase ambiguity at any given epoch to be consistent with those models with different probabilities.

The system 200 can include additional sensors 220 that can help in aiding the positioning system. For instance, the sensors 220 can include an inertial measurement unit (IMU), a camera, wheel encoders if mounted in a wheeled vehicle, a laser. For example, when connected to a car, the IMU and wheel encoders can be used in a motion model of the vehicle to increase accuracy of the positioning system beyond what otherwise would be possible.

The system 200 includes a processor 230 for tracking the state of the receiver using a probabilistic filter 285. Further, the processor 230 is configured to select 231 a subset of measurements with respect to the set of measurements. Also, the processor 230 is configured to execute and/or run a probabilistic filter 232 determining states of the receiver 210 by jointly using the probabilistic motion model 281 and the probabilistic measurement model 282. The probabilistic filter determines a joint probability distribution of the state of the receiver 210 with respect to the probabilistic motion model 281 and the probabilistic measurement model 282 and can be executed by the processor 230.

Alternatively, or additionally, the probabilistic measurement model of the probabilistic filter 232 includes different combinations 231 of real values of the carrier phase ambiguities selected from the set of possible combinations. For example, the probabilistic filter 232 uses a probabilistic measurement model 282 with its corresponding and unique combination of values of the carrier phase ambiguities selected using the probabilities of consistency of real-valued ambiguities with the measurement model of the subset or measurements 231. Hence, using a probabilistic filter enables using the inherent uncertainty to explore different ambiguities.

Next, the processor determines 260 the state of the receiver using a probabilistic filter. Some embodiments determine the state of the receiver as the state with the highest joint probability of the state of the receiver according to the subset of measurements of the carrier and the code signals. Other embodiments determine the state of the receiver as the weighted mean of the different possibilities of state of the receiver. In such a manner, the estimation of the carrier phase ambiguities is included in the probabilistic filter 232, which can be advantageous because it streamlines and simplifies the estimation procedure.

The IMU can include 3-axis accelerometer(s), 3-axis gyroscope(s), and/or magnetometer(s). The IMU can provide velocity, orientation, and/or other position related information to the processor 230. In some embodiments, the IMU can output measured information in synchronization with the capture of each image frame from a camera. In some embodiments, the output of the IMU is used in part by the processor 230 to fuse the sensor measurements and/or to further process the fused measurements.

The system 200 can include a transmitter 250 enabled to transmit one or more signals. For instance, the transmitter 250 can send the state of the receiver 240 to other estimation methods, to be used in fusion with other sensors to improve accuracy. The receiver 240 and transmitter 250 can receive and transmit over one or more types of wireless communication networks. The receiver 240 and transmitter 250 can permit communication with wireless networks based on a variety of technologies such as, but not limited to, femtocells, Wi-Fi networks or Wireless Local Area Networks (WLANs), which may be based on the IEEE 802.11 family of standards, Wireless Personal Area Networks (WPANS) such Bluetooth, Near Field Communication (NFC), networks based on the IEEE 802.15x family of standards, and/or Wireless Wide Area Networks (WWANs) such as LTE, WiMAX, etc. The system 200 can also include one or more ports for communicating over wired networks, such as the controller area network (CAN) bus.

The memory 280 can store 286 carrier phase measurements, as well as data provided by the sensors 220. For example, in some implementations, the memory 280 stores a geometry of the physical construction on which the receiver is mounted 284, and a geometrical relationship between the satellites and the receivers 283. In general, the memory 280 can represent any data storage mechanism. The memory 280 can include, for example, a primary memory and/or a secondary memory. The primary memory can include, for example, a random access memory, read only memory, etc. While illustrated in FIG. 2B as being separate from the processors 230, it should be understood that all or part of a primary memory can be provided within or otherwise co-located and/or coupled to the processors 230.

The different components in the system 200 can be operatively coupled to other each other through connections 250. The connections 250 can comprise buses, lines, fibers, links or combination thereof.

The processor 230 can be implemented using a combination of hardware, firmware, and software. The processor 230 can represent one or more circuits configurable to perform at least a portion of a computing procedure or process related to sensor fusion and/or methods for further processing the fused measurements. The processor 230 retrieves instructions and/or data from memory 280. The processor 230 can be implemented using one or more application specific integrated circuits (ASICs), central and/or graphical processing units (CPUs and/or GPUs), digital signal processors (DSPs), digital signal processing devices (DSPDs), programmable logic devices (PLDs), field programmable gate arrays (FPGAs), controllers, micro-controllers, microprocessors, embedded processor cores, electronic devices, other electronic units designed to perform the functions described herein, or a combination thereof.

Figure 2C:
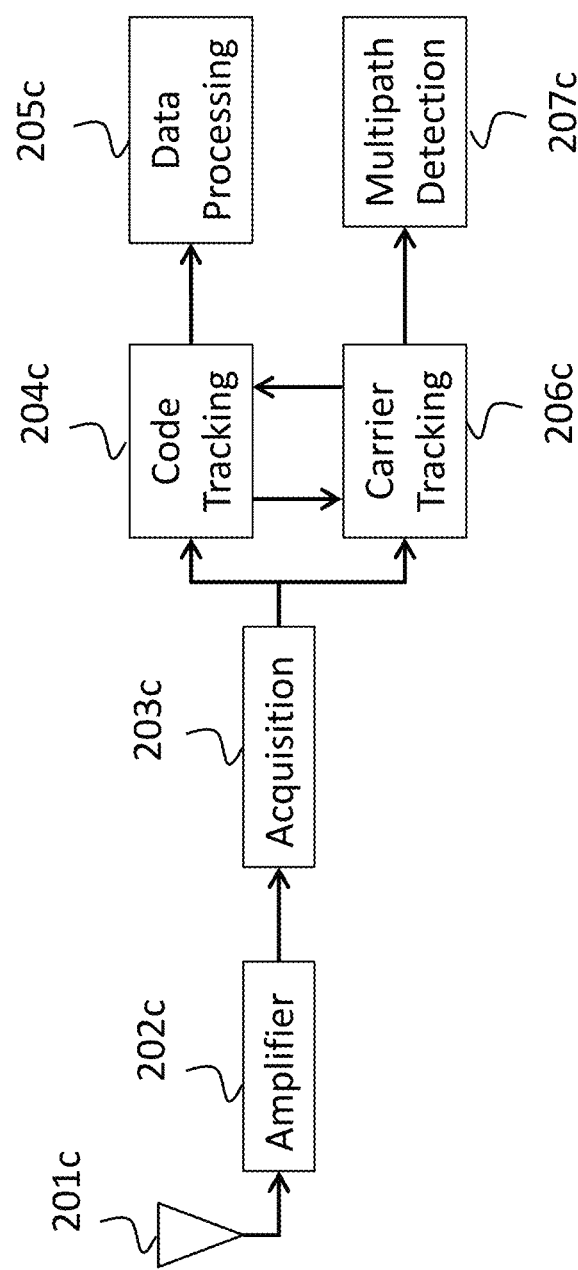
FIG. 2C shows a block diagram of a receiver used by some embodiments.

FIG. 2C shows a block diagram of a receiver used by some embodiments. In those embodiments, the measurements to detect the presence of multipath 207c are natively computed in the receiver as part of the process by which position is estimated. After the antenna 201c, and before acquisition 203c, the received signal is made up of the sum of the signals emitted by each satellite. An amplifier 202c is designed to strengthen the signal for further processing. The acquisition 203c initializes the tracking process by supplying estimates for the phase and frequency of each received satellite signal. The tracking unit is tasked with estimating and providing measurements of the phase and frequency of each satellite signal over time for the carrier wave 206c and for code tracking 204c. The code tracking 204c is used to determine and process 205c the data messages. The carrier wave tracking 206c is used to determine the multipath 207c.

Some GNSS receivers can have several antennae for a single receiver, but combinations of several antennae with as many receivers are conceivable. One embodiment uses multiple antennae with as many receivers as antennae. The antennae are spatially separated, which allows the receivers to detect differences between the observed carrier frequencies on the same satellite signal.

Some embodiments are based on the knowledge that determining which SD measurements to use in the probabilistic filter can be done by means of optimization. Specifically, one embodiment is based on the fact that using the position of the satellites and the position of the receiver, it is possible to quantify the information available in each SD measurement in the measurement matrix in FIG. 1C. Based on the quantification of the information of each SD measurement, the combination of satellites minimizing the loss of information subject to a predetermined maximum number of satellites can be determined by optimizing a cost function of measurements, such that the loss of information is a difference between the cost function of having the set of measurements as the measurements and the cost function of having the subset of measurements as the measurements.

Figure 3A:
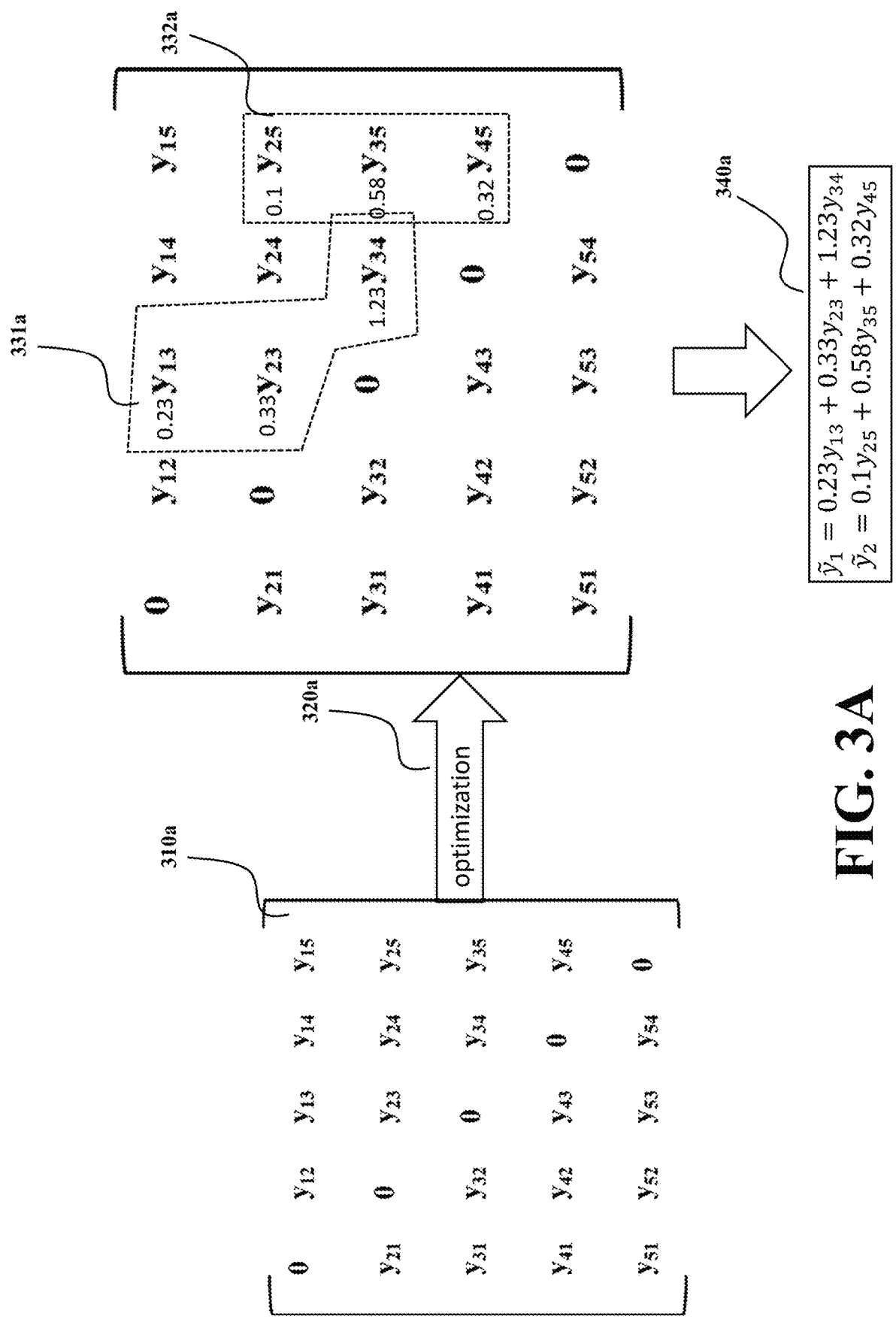
FIG. 3A illustrates the result from an optimization procedure for minimizing the loss of information of a subset of measurements with respect to the set of measurements according to one embodiment.

FIG. 3A illustrates the result from an optimization procedure for minimizing the loss of information of a subset of measurements with respect to the set of measurements according to one embodiment. The full measurement matrix 310a consisting of 10 unique measurements. Based on a maximum number of measurements set to 2, minimizing 320a the loss of information results in the weighted combination of measurements 331a and 332a selected as the best measurements to use, forming the subset of measurements 340a.

One embodiment realized that it is possible to quantify the information of measurements probabilistically by the use of the Fisher information. The Fisher information is a way of measuring the amount of information that an observable random variable carries about an unknown parameter of a distribution that models the variable.

Some embodiments utilize the Fisher information matrix (FIM) to project the acquired measurements into a lower-dimensional subspace, formulating an optimization program to find the projected measurement that minimally degrades estimator performance with respect to the mean squared error (MSE) of the estimate. Using the projected measurements achieves a significant computational speedup while retaining the performance as much as possible, and allows for GNSS positioning without having the ambiguities as integers.

In one embodiment, the probabilistic measurement model is expressed as a Gaussian probability density function $p(y;\theta) = \mathcal{N}(y; h_p(\theta), R)$, wherein $h_p$ is the deterministic part of the measurement model relating the position of the receiver to the measurement, $\theta$ is the position of the receiver expressed as a parameter, and R is the covariance of the measurement noise. For any unbiased estimate $\hat{\theta}$ of $\theta$, the FIM $\mathcal{I}(y; \theta)$ lower-bounds the variance of the estimation error according to $\mathbb{E}[\|\theta-\hat{\theta}\|_2^2] = \text{Tr}(\mathbb{E}[(\theta-\hat{\theta})(\theta-\hat{\theta})^T]) \geq \text{Tr}(\mathcal{I}(y; \theta^{-1})$. That is, the FIM gives a lower bound on how small the variation of the position estimate around the true position can be. The lower bound, i.e., the trace of the inverse of the FIM is denoted by the Cramer-Rao bound (CRB).

Accordingly, one embodiment minimizes the trace of the inverse of the FIM, $\text{Tr}(\mathcal{I}(\tilde{y}; \theta)^{-1})$, since it maximizes the information of the subset of measurements. This gives rise to a reduced FIM, which is the FIM of the reduced set of measurements, i.e., subset of measurements.

Some embodiments constrain the maximum number of measurements to a number $\tilde{M} \leq 2M$ wherein M is the number of unique SD or DD carrier/code signals.

One embodiment is based on the understanding that to find the subset of measurements is the equivalent problem of finding a projection from the original set of measurements $\mathcal{Y}_k$ to a projected set of measurements, i.e., a subset of measurements $\tilde{\mathcal{Y}}_k$. One embodiment uses a projection operator $\Psi_k: \mathbb{R}^{2M} \to \mathbb{R}^{\tilde{M}}$ according to $\tilde{\mathcal{Y}}_k = \Psi_k(y_k)$, such that a maximal amount of information is retained in the projected measurements, i.e., the projection operator is chosen such that it minimizes the loss of information of the reduced FIM compared to the FIM using the full set of measurements.

Figure 4A:
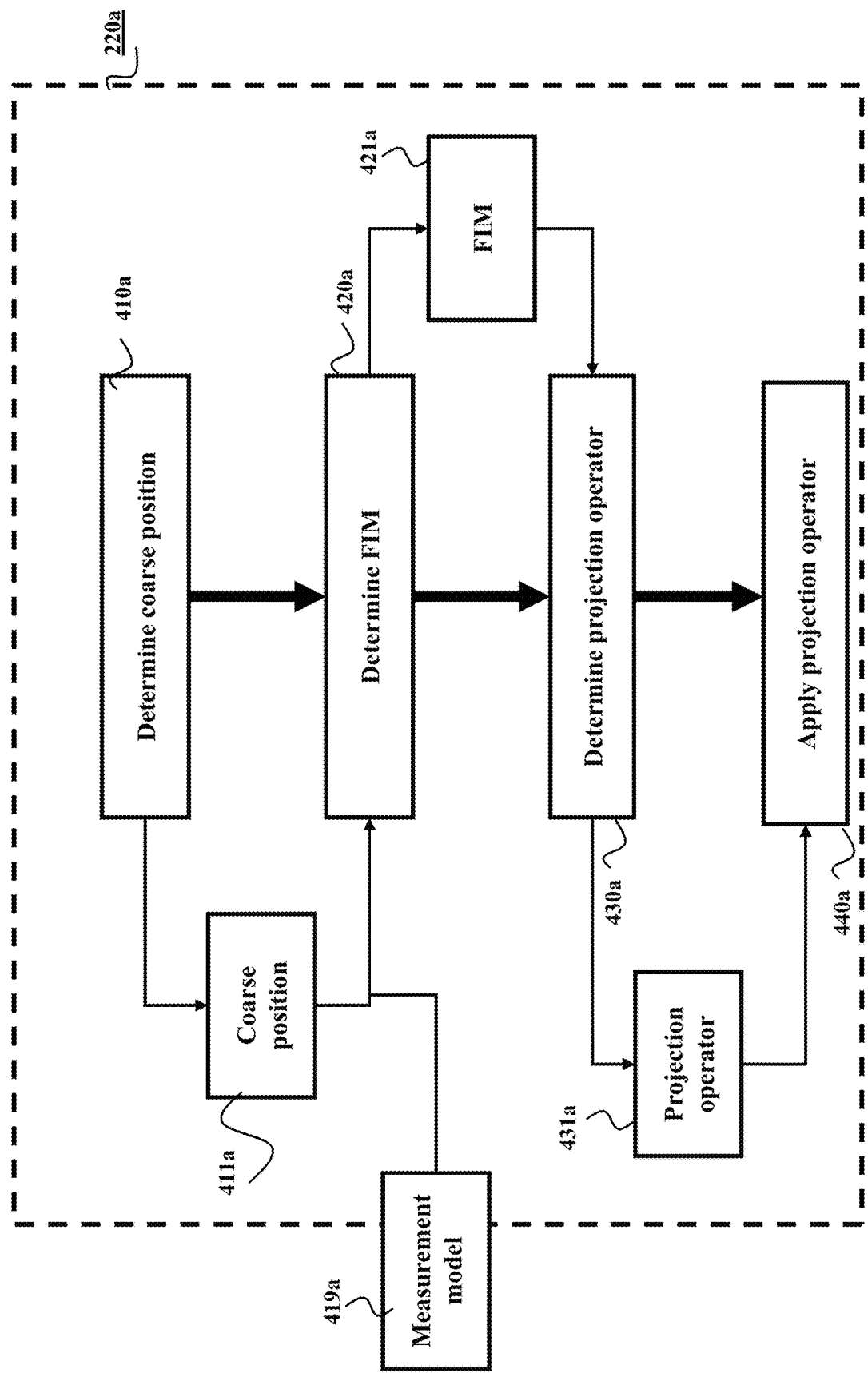
FIG. 4A shows a flowchart of a method for selecting the subset of measurements according to some embodiments.

FIG. 4A shows a flowchart of a method 220a for selecting the subset of measurements according to one embodiment, wherein the method is executed by a processor. First, the method determines 410a a coarse position 411a of the receiver corresponding to at least one code signal. For instance, in one implementation the coarse position is determined by optimizing the fit of the coarse position to the code signals, e.g., by solving a least-squares problem. Using the coarse position 411a and the measurement model 419a, the method determines 420a the FIM 421a by inserting the coarse position into the measurement model. Next, the method determines 430a a projection operator 431a that reduces the FIM to a reduced FIM, i.e., an FIM of the subset of measurements with the size of the subset of measurements, by minimizing the loss of information in the reduced FIM with respect to the FIM of the full set of measurements. Finally, the method applies 440*a* the projection operator to the full measurement matrix to produce the subset of measurements.

Figure 4B:
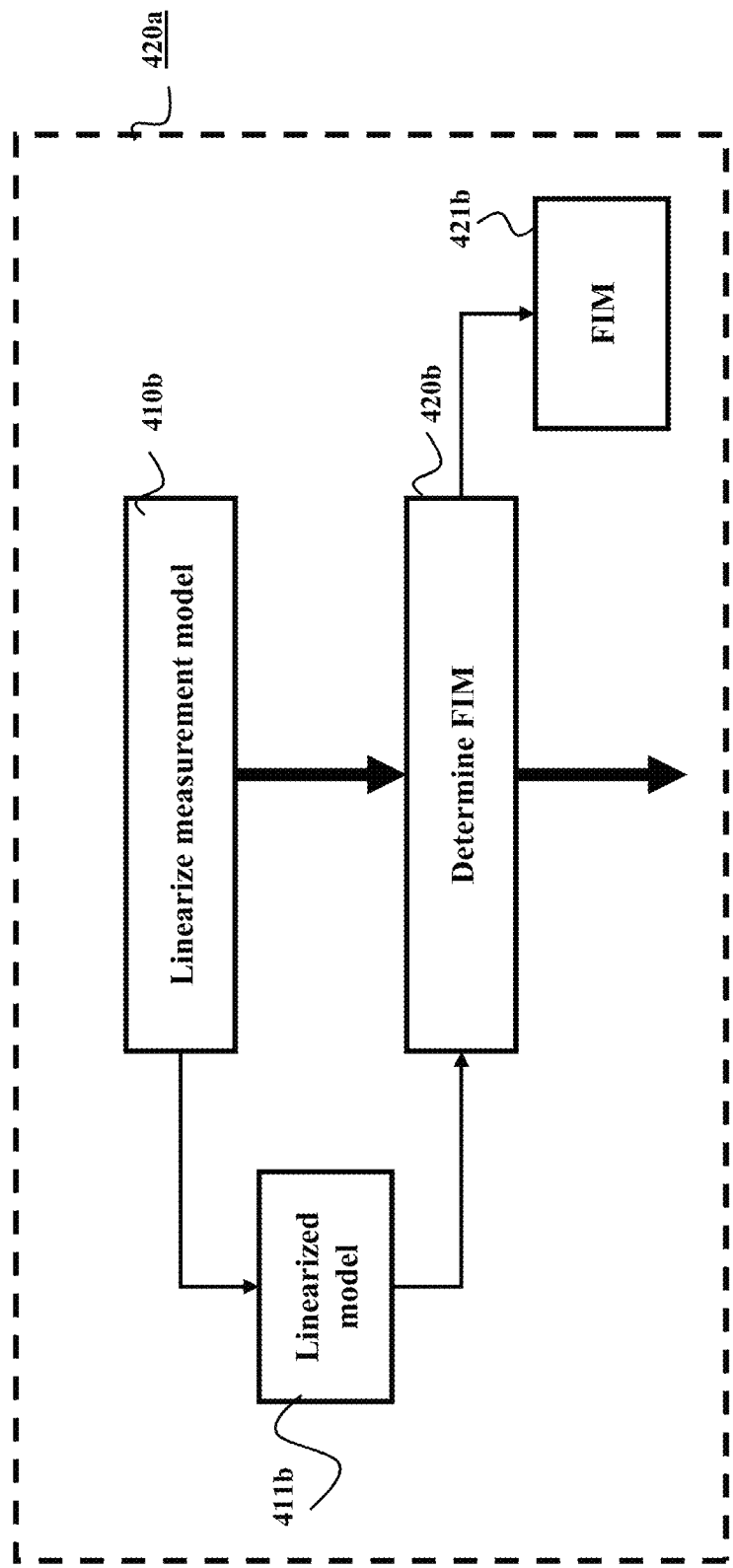
FIG. 4B shows an implementation of a method 420a for the determining a reduced FIM according to one embodiment

FIG. 4B shows an implementation of a method 420*a* for the determining a reduced FIM according to one embodiment. In general $h_p$, i.e., the deterministic part of the measurement model relating the position of the receiver to the measurement, is nonlinear due to the distance calculation involved between receiver and satellites. In one embodiment, the method linearizes 410*b* the nonlinear measurement model around the coarse position. Next, using the linearized model 411*b*

$$H_p = \frac{\partial h_p(\theta)}{\partial \theta}\bigg|_{\theta=p^*},$$

the method determines 420*b* the FIM 421*b* as a function of the projection operator $\Psi_k: \bar{\mathbb{R}}^{2M} \to \mathbb{R}^{\tilde{M}}, \mathcal{I}\;\tilde{\mathcal{Y}}; \theta) = (\Psi H_p)^T (\Psi R \Psi^T)^{-1} \Psi H_p$.

Some embodiments are based on the understanding that the minimization of the CRB is a nonconvex optimization problem, where numerical methods are necessary. In one embodiment the determining the projection operator that optimizes the CRB is implemented iteratively until a termination condition is met.

Figure 4C:
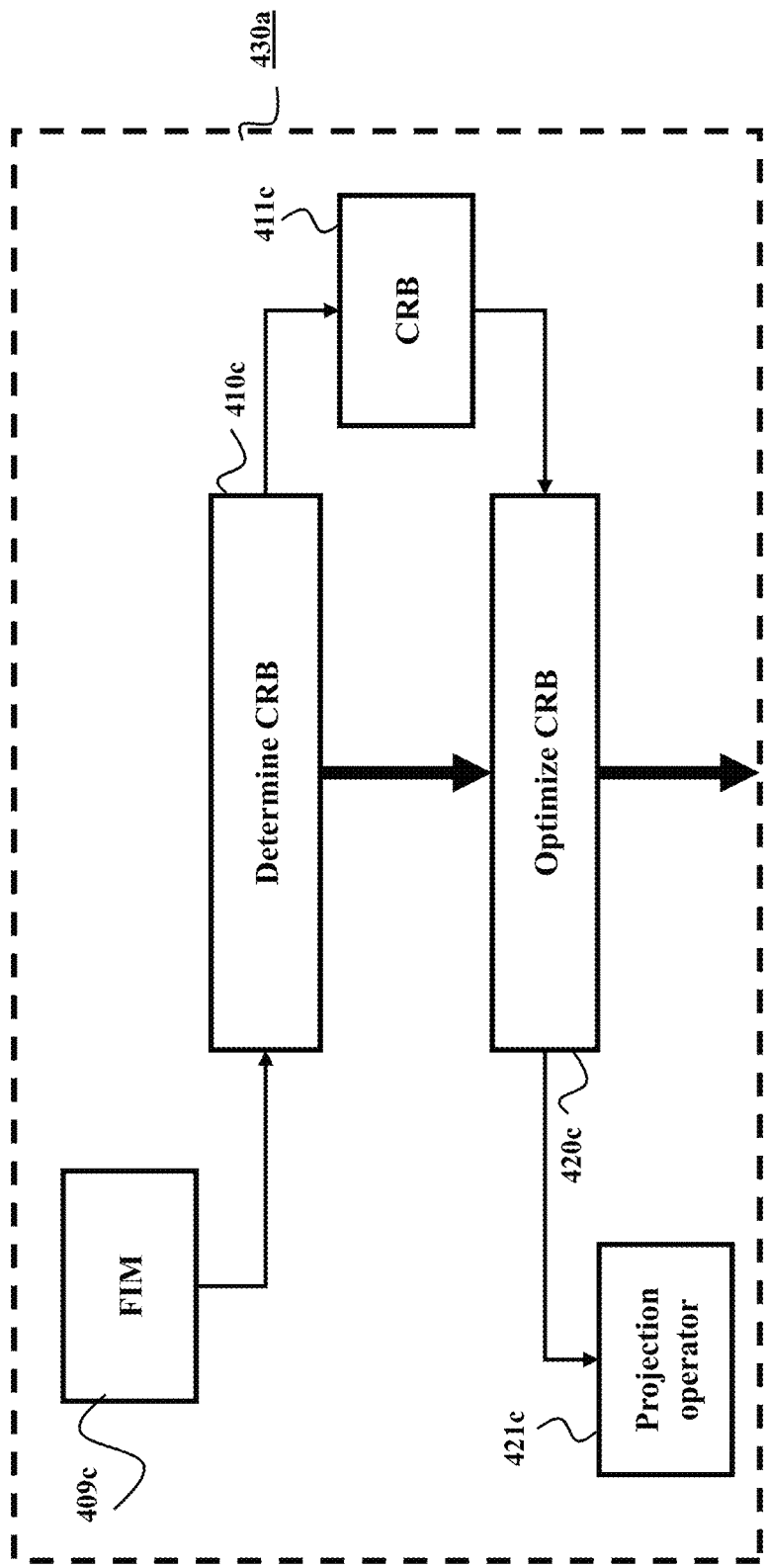
FIG. 4C shows a flowchart of a method 430a for determining the projection operator to produce the subset of measurements according to some embodiments

FIG. 4C shows a flowchart of a method 430*a* for determining the projection operator to produce the subset of measurements according to some embodiments. First, the method 430*a* determines 410*c* the CRB 411*c* using the reduced FIM 409*c*. Next, in some embodiments, the method determines the CRB as the trace of the inverse of the reduced FIM, $\mathrm{Tr}([(\Psi H_p)^T (\Psi R \Psi^T)^{-1} \Psi H_p]^{-1})$, i.e., by summing the diagonal elements of the inverse of the reduced FIM. Using the determined CRB 411*c* as a function of the projection operator, the method optimizes the CRB by selecting the projection operator that produces the optimal subset of measurements minimizing the loss of information relative to the full set of measurements, to find a projection operator 421*c* $\Psi_k: \bar{\mathbb{R}}^{2M} \to \mathbb{R}^{\tilde{M}}$ projecting the full set of measurements to a subset of measurements $\tilde{\mathcal{Y}}_k = \Psi_k(\mathcal{Y}_k)$.

The method is based on the understanding that the position is uncertain, but the uncertainty is much smaller than the distance between receiver and the satellites. For instance, referring to FIG. 1G, an estimation of receiver position using code measurements results in an estimation error in the order of a few meters. However, the distance between a receiver and the satellites can be thousands of kilometers. One embodiment utilizes this to determine a coarse position, e.g., using code measurements, to determine the CRB as a function of input measurements.

Figure 4D:
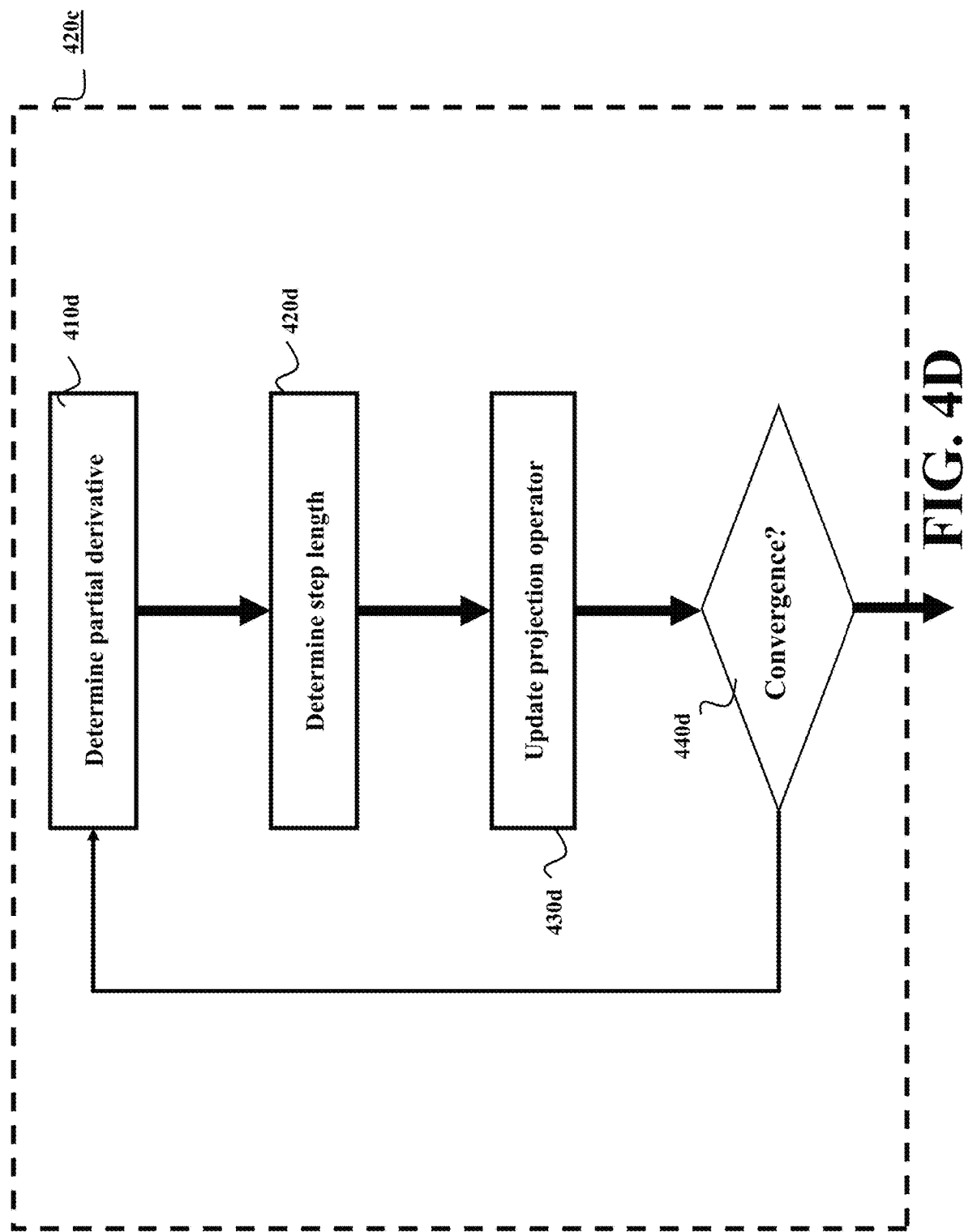
FIG. 4D shows a flowchart of a method for optimizing the CRB finding the optimal projection operator finding the subset of measurements minimizing the loss of information according to one embodiment.

FIG. 4D shows a flowchart of a method for optimizing the CRB finding the optimal projection operator finding the subset of measurements minimizing the loss of information according to one embodiment. The optimization problem of minimizing the CRB is formulated as $$\min_{\Psi \in \mathbb{R}^{M \times M}} J(\Psi),$$

wherein $$J(\Psi) = Tr([(\Psi H_p)^T (\Psi R \Psi^T)^{-1} \Psi H_p]^{-1}).$$

The optimization problem is solved using a gradient descent method and the method iterates until a convergence criterion is met. The method determines 410*d* a partial derivative of the CRB. One embodiment is based on the understanding that even though the CRB is a highly nonlinear function, its derivative can be determined as an analytic function $$\frac{\partial Tr(I(\hat{y};\theta)^{-1})}{\partial \Psi} = -2UQ\Lambda^{-2}Q^\top V^\top,$$

wherein $Y = H_p^T \Psi^T (\Psi R \Psi^T)^{-1} \Psi H_p,$ $U = (\Psi R \Psi^T)^{-1} \Psi H_p,$ $V = H_p - R \Psi^T U,$ and where $Y = Q \Lambda Q^T$ and $$H_p = \frac{\partial h_p(\theta)}{\partial \theta}\bigg|_{\theta=p^*}.$$

One embodiment is based on the recognition that in order to determine the derivative, rank conditions need to be met. Another embodiment understands that the rank condition is met whenever there are at least 3 SD or DD satellite signals available. In one embodiment, this rank constraint is imposed by adding a rank constraint to the optimization problem.

Next, the method determines a step length 420*d* using γ a line search to control the movement of the solution along the direction of the gradient. In other words, controlling the step length guarantees convergence of the method to a local optimum.

Using the step length and derivative of CRB, the method updates 430*d* the projection operator by taking a step with length γ along the direction of the derivative of the CRB as a function of the projection operator. In one embodiment, this is done according to $$\Psi_{k,n} = \Psi_{k,n-1} + 2\gamma U_n Q_n \Lambda_n^{-2} Q_n^\top V_n^\top,$$

$$[\Lambda_n, Q_n] = eig(Y_n),$$

$$Y_n = H_{p,k}^\top \Psi_{k,n-1}^\top U_n,$$

$$V_n = H_{p,k} - R_k \Psi_{k,n-1}^\top U_n,$$

$$U_n = (\Psi_{k,n-1} R_k \Psi_{k,n-1}^\top)^{-1} \Psi_{k,n-1} H_{p,k},$$

$$H_p = \frac{\partial h_p(\theta)}{\partial \theta}\bigg|_{\theta=p_k^*},$$

If the convergence criterion is met 440*d*, the method outputs the projection operator, and if not, the method determines 410*d* the partial derivative using the updated projection operator.

Some embodiments acknowledge the fact that even though linearization causes the CRB to be approximate, the linearization has negligible effect since the distance between satellite and receiver is large. In other words, using the coarse position, as long as the error is within a few meters, has little effect on the linearization error.

One embodiment is based on the understanding that from an algorithmic standpoint, the combination of satellites does not have to include full satellites. For instance, consider the case of having five satellites and choosing four of these. Then, it may be better to use a fourth of the measurement of the first satellite and three fourths of the fourth satellites, than to combine full satellite measurements. In other words, the combination of satellite measurements forming a measurement is a noninteger combination of satellites. Intuitively, this is because the FIM captures the uncertainty in the system, and although a combination of full satellites has highest probability, since there is some uncertainty about the correctness of such combination, it is safer from an MSE standpoint to choose noninteger combinations.

Figure 4E:
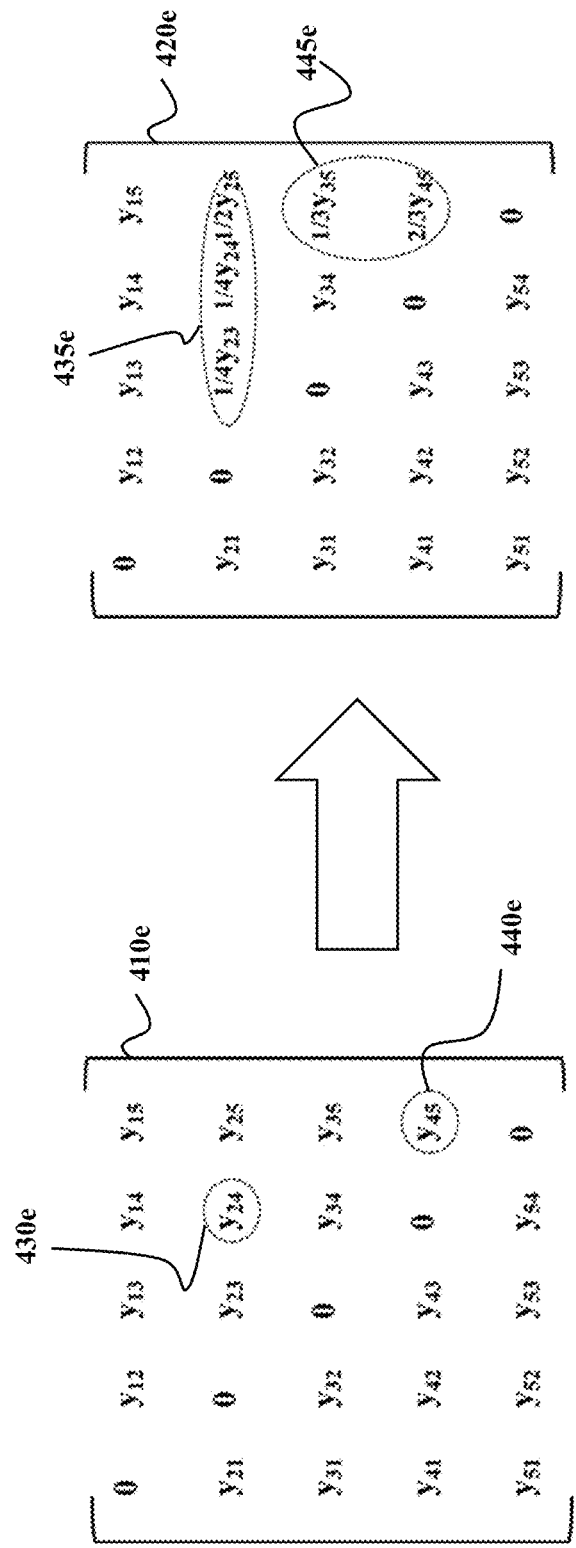
FIG. 4E shows a schematic of fractional measurement representations according to some embodiments.

FIG. 4E shows a schematic of fractional measurement representations according to some embodiments. In this example, measurements of matrix 410e is represented as weighted combinations of different measurements 420e. For example, a measurement 430e is replaced with a weighted combination 435e, while a measurement 440e is replaced with a weighted combination 445e. Some embodiments are based on the recognition that the cost function is scale invariant, i.e., $J(\alpha\Psi)=J(\beta\Psi)$ for all $\beta\neq 0$, $\alpha\neq 0$. Hence, the linear operator can be normalized to keep the magnitude of the projected measurements constant. For example, in some implementations, the weighted combination of different measurements is a combination such that all weights sum to one. In other implementations, the projection operator resulting from the optimization program is normalized, e.g., it is scaled to have unity norm. Doing such normalizations can be beneficial when implementing on embedded hardware with finite numerical precision.

One embodiment is based on the understanding that projecting the measurements into a subset of measurements will always mean a loss of information, i.e., the cost function $J(\Psi)$ will never be smaller than $J(I)$, as the linear combination of measurements cannot contribute any new information. In one embodiment, this understanding is used to determine the quality of the solution of the optimization program. E.g., if the ratio $J(\Psi)/J(I) \rightarrow 1$, the linear projection operator resulting from the optimization gives the same performance as when using the full set or measurements. Similarly, if the ratio is large, the optimized projection operator is suboptimal and will lead to degraded performance. Hence, when the ratio is large, one embodiment increases the allowed maximum number of measurements in the subset of measurements to find a better projection operator. In some implementations, this procedure is iterated until a suitable ratio has been determined.

One embodiment is based on the understanding that since it is enough to use a coarse position, the projection operator does not need updating at each time step. That is, the determining the projection operator can be updated when the coarse position has changed larger than a threshold, wherein the threshold can be predetermined according to the sensitivity of the measurement model to changes in the coarse position.

Figure 5A:
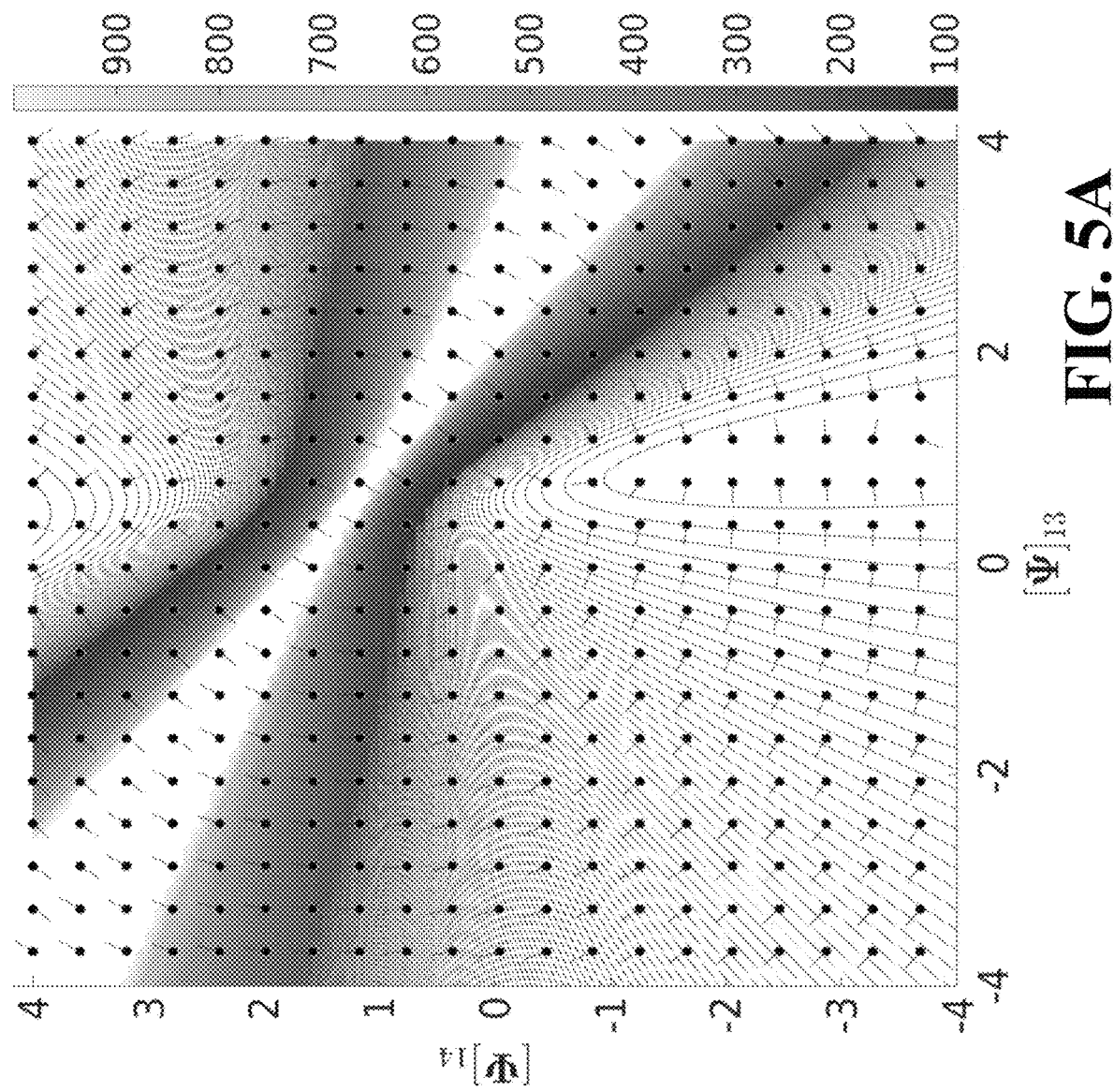
FIG. 5A illustrates the level sets of the CRB when varying two of the matrix elements of a particular choice of projection operator with according to one embodiment.
Figure 5B:
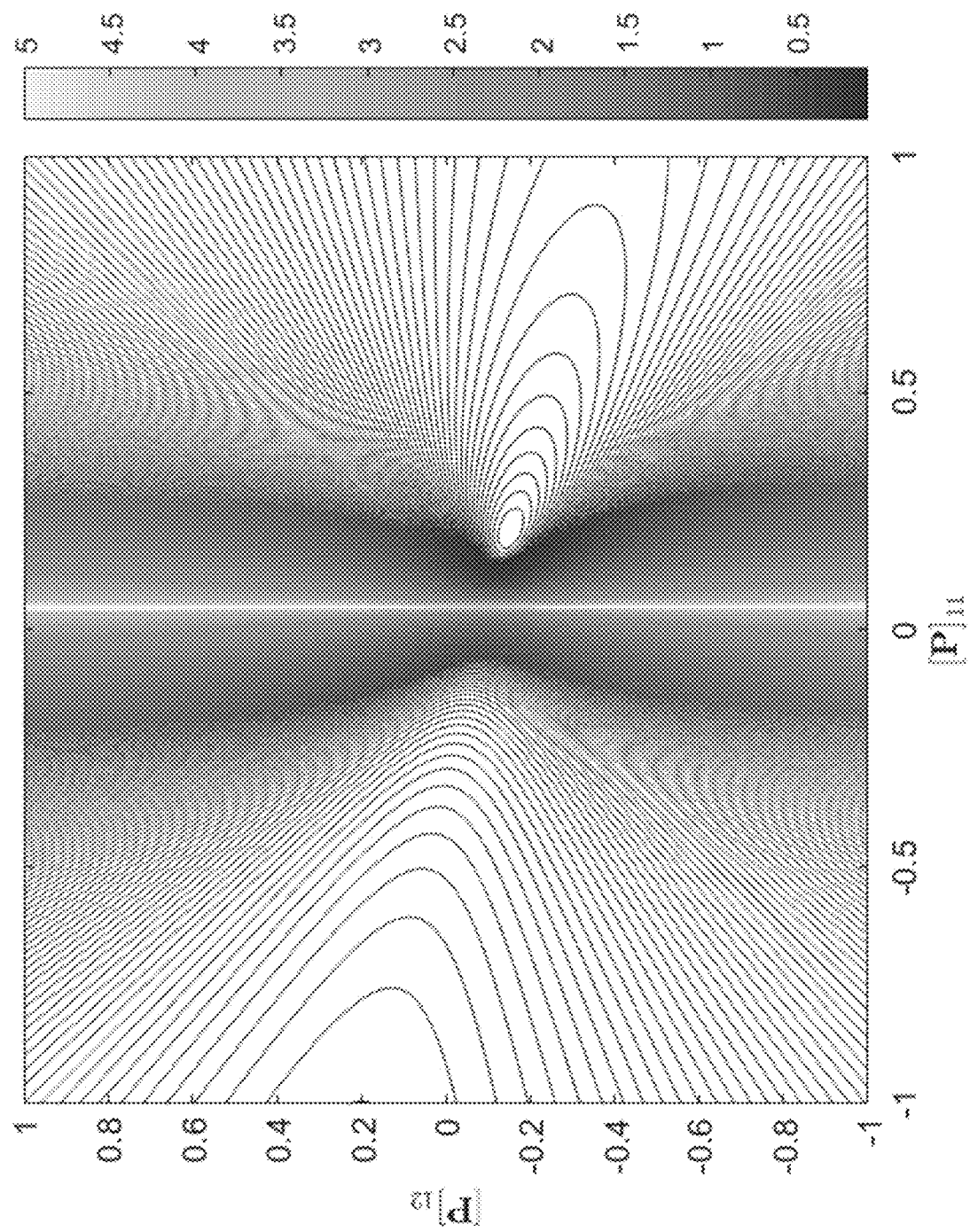
FIG. 5B illustrates the level sets of the CRB when varying two of the matrix elements of a particular choice of projection operator with according to one embodiment.
Figure 5C:
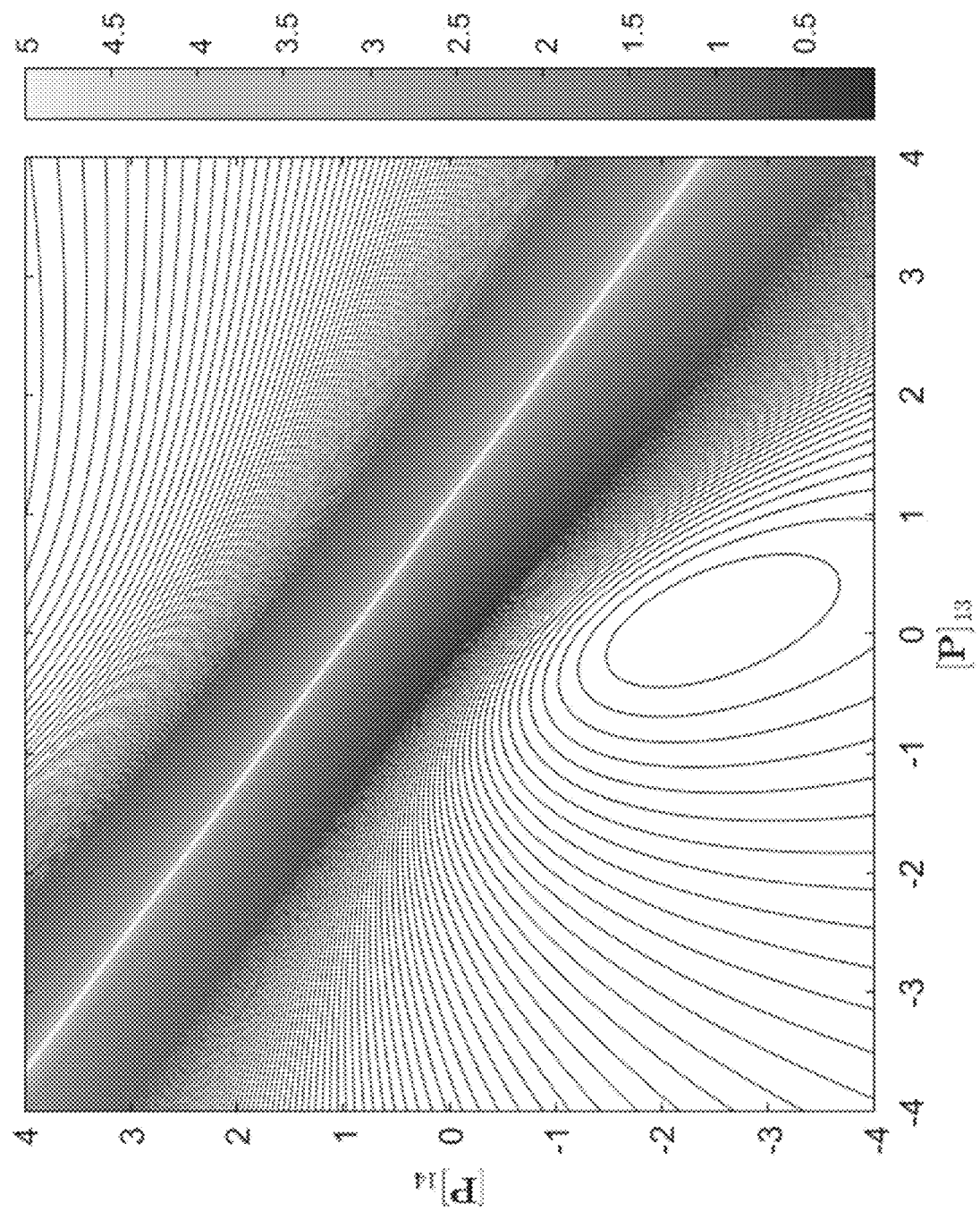
FIG. 5C illustrates the level sets of the CRB when varying two of the matrix elements of a particular choice of projection operator with according to one embodiment.

FIGS. 5A 5B, and 5C illustrate the level sets of the CRB when varying two of the matrix elements of a particular choice of projection operator with. The level sets are globally nonconvex, but convex for large parts of the regions. Furthermore, the illustrations indicate that the optimization of the CRB leads to fractions of satellites as part of the subset of measurements. In other words, the FIM defines a space in a system of coordinates of the set of measurements, wherein it is possible to find a surface of the space corresponding to the subset of measurements and finds a point on the surface with maximum value of elements of the FIM, wherein the point on the surface corresponds to ambiguities that are not integers.

Various probabilistic filters to determine the state of the receiver can be implemented using the subset of measurements. For instance, one embodiment uses a Kalman filter, wherein the real-valued ambiguities can be straightforwardly added to the state of the estimation problem, as is well understood by an expert in the field.

Figure 6A:
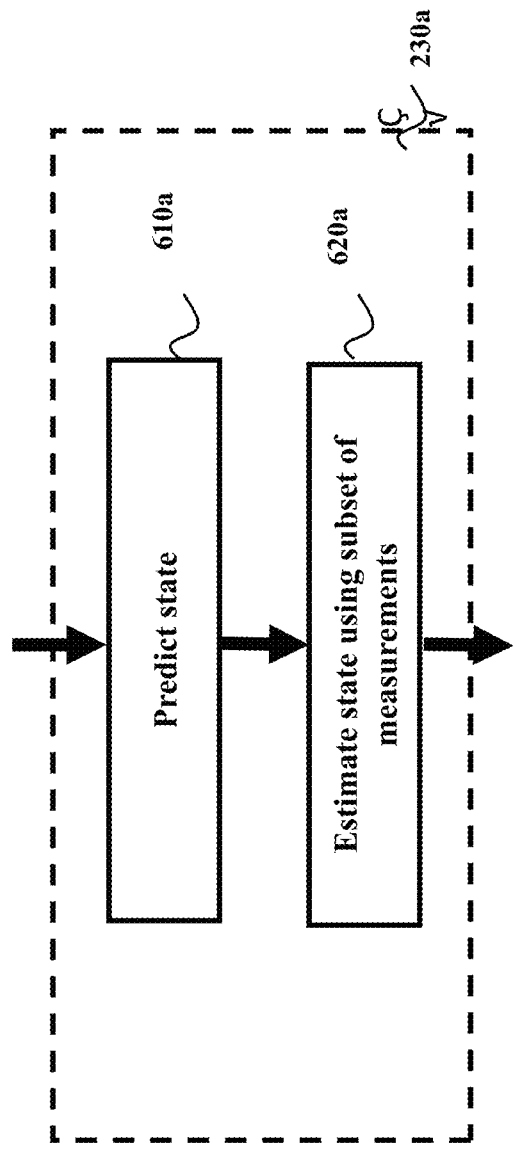
FIG. 6A shows an example of execution of one iteration of a probabilistic filter according to one embodiment.

FIG. 6A shows an example of execution of one iteration of a probabilistic filter 230a according to one embodiment. Using motion data of the receiver and the probabilistic motion model described according to other embodiments, the method 610a predicts the state, real-valued ambiguities, and corresponding probability density functions from a previous state to a current state. Then, the method estimates 620a the states, ambiguities, and corresponding probability density functions using the subset of measurements.

Figure 6B:
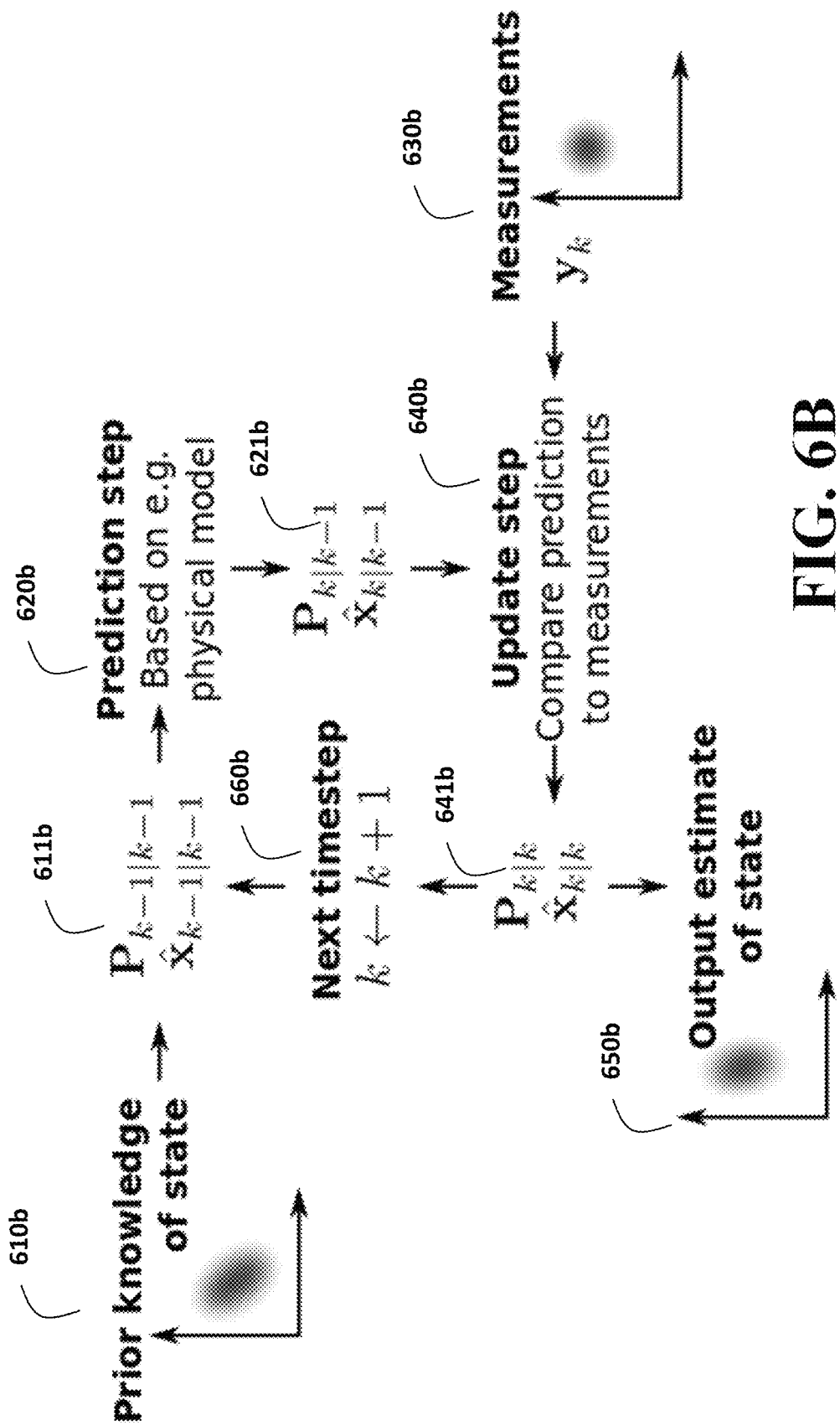
FIG. 6B shows a schematic of the Kalman filter (KF) used by some embodiments for state estimation.

FIG. 6B shows a schematic of the Kalman filter (KF) used by some embodiments for state estimation. The KF is a tool for state estimation in linear state-space models, and it is the optimal estimator when the noise sources are known and Gaussian, in which case also the state estimate is Gaussian distributed. The KF estimates the mean and variance of the Gaussian distribution, because the mean and the variance are the two required quantities, sufficient statistics, to describe the Gaussian distribution.

The KF starts with an initial knowledge 610b of the state, to determine a mean of the state and its variance 611b. The KF then predicts 620b the state and the variance to the next time step, using a model of the system, to obtain an updated mean and variance 621b of the state. The KF then uses a measurement 630b in an update step 640b using the measurement model of the system, to determine an updated mean and variance 641b of the state. An output 650b is then obtained, and the procedure is repeated for the next time step 660b.

In some embodiments, the probabilistic filter is a particle filter, wherein each particle includes a possible unique real-valued set of ambiguities, and a KF determining the state of the receiver using the set of ambiguities and the subset of measurements not having the ambiguities as integers. Some embodiments are based on realization that the probabilistic nature of the motion and measurement models is captured by a probability density function (PDF) defined by real values of state and ambiguities.

Other embodiments estimate the PDF of the state and ambiguities by a set of N particles, resulting in the PDF $p(x_k, n_{0:k} | y_{0:k})$, where $y_{0:k}$ are the measurements of the carrier and code signals. For instance, one embodiment represents the PDF of the ambiguity conditioned on the carrier and code measurements as a weighted sum of the ambiguity hypotheses, $$p(n_{0:k} | y_{0:k}) \approx \sum_{i=1}^{N} q_k^i \delta(n_{0:k}^i - n_{0:k}),$$

where $q_k^i$ is the probability of the ith sampled float ambiguity, and similar for the state of the receiver.

Figure 7A:
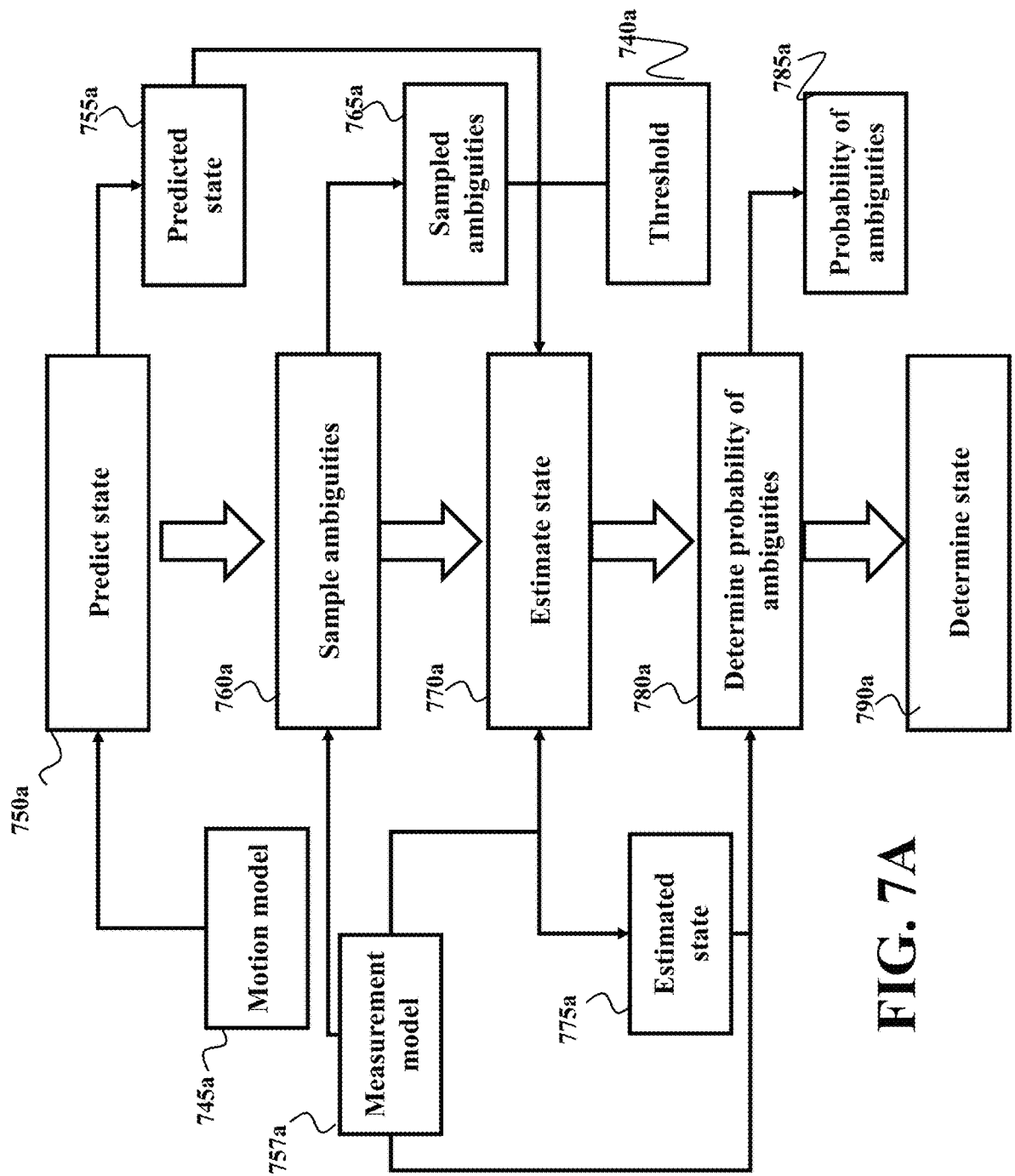
FIG. 7A shows a block diagram of one iteration of a marginalized particle filter (MPF) for determining the state of the receiver according to one embodiment of the invention.

FIG. 7A shows a block diagram of one iteration of a marginalized particle filter (MPF) for determining the state of the receiver according to one embodiment of the invention. The MPF predicts 750a the state of the receiver using a motion model 745a of the receiver and a previous state of the receiver determined during a previous iteration. Then, using a measurement model 757a of the subset of measurements, the MPF samples 760a a set of possible ambiguities 765a. Using the predicted state 755a, the measurement model 757a, and the sampled ambiguities 765a, the MPF estimates 770a the state of the receiver. Next, the MPF determines 780a the probability of each of the sampled ambiguities according to the consistence with the measurement model 757a when combined with the estimated state 775a. The probability 785a of each ambiguity is finally used to determine 790a the probability density function and state of the receiver.

Figure 7B:
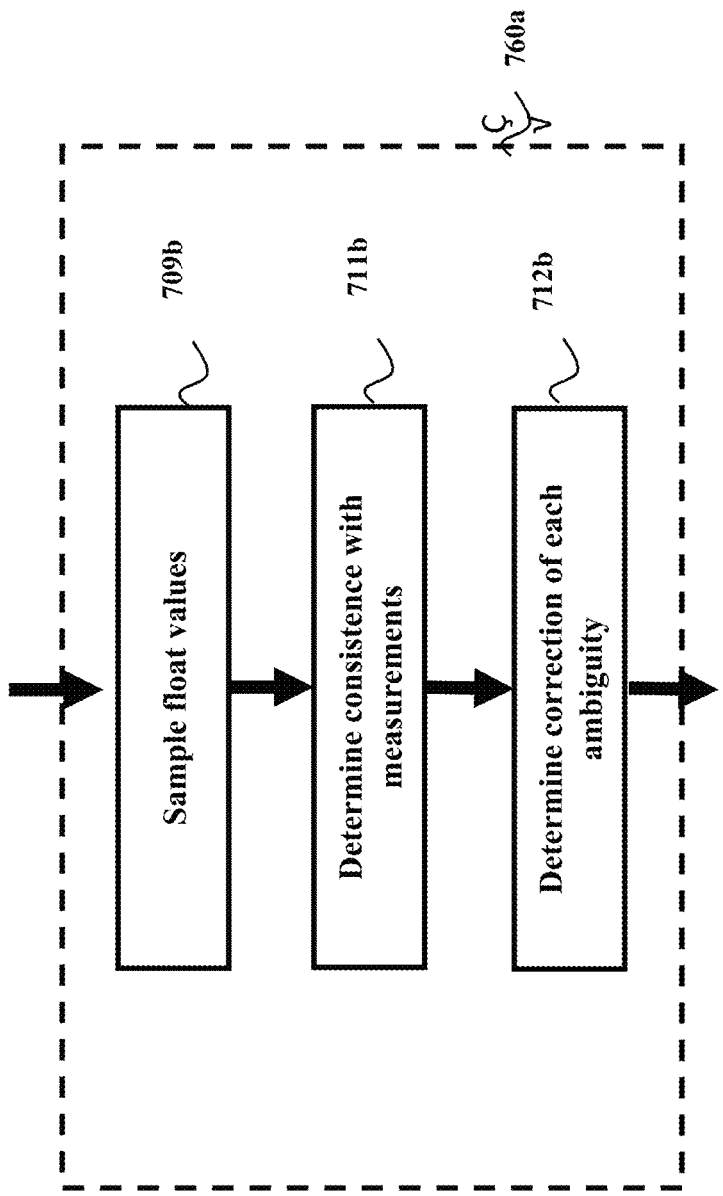
FIG. 7B shows a flowchart of an exemplar implementation of a method that samples the float values of ambiguities according to one embodiment.

FIG. 7B shows a flowchart of an exemplar implementation of the method 760a that samples the float values of ambiguities according to one embodiment. However, the sampling 760a the ambiguities are implemented in several ways by different embodiments. The method of FIG. 7B first samples 709b ambiguities consistent with the motion model and its process noise. The method determines 711b consistence with the subset of measurements of the code and carrier phase signals, by inserting sampled carrier phase ambiguities, the estimated position, and the subset of measurements of the carrier and the code signals into the measurement model. Based on the consistence with the measurement, the method corrects 712b each sampled float value as a function of the process noise and the measurement noise In other embodiments, the sampled ambiguity is determined by first; drawing a sample from the process noise, then; using the sampled process noise correcting the sample by a Kalman-type correction $$p(\tilde{n}_k^i \mid \hat{\tilde{n}}_{k-1}^i, y_{0:k}) = \mathcal{N}(\tilde{n}_k; \hat{\tilde{n}}_k^i, \tilde{P}_k^i),$$

$$\hat{\tilde{n}}_k^i = \hat{\tilde{n}}_{k-1}^i + K_k^i(\mathcal{P}_k y_k - \hat{y}_{k|k-1}^i),$$

$$K_k^i = Q_{\tilde{n}}(Q_{\tilde{n}} + \tilde{S}_k^i)^{-1},$$

$$\tilde{P}_k^i = K_k^i \tilde{S}_k^i$$

$$Q_{\tilde{n}} = \lambda^2 \mathcal{P}_k G Q_n G^\top \mathcal{P}_k^\top.$$

that is, every sampled ambiguity is corrected with the difference from the measurement $\hat{y}_k$ with the projection operator and the fit $\hat{y}_{k|k-1}^i$ of the measurement model using the sampled ambiguity. With this correction, the probability of the ambiguity is determined from the probabilistic measurement model as a Gaussian function of the process and measurement noise, the sampled ambiguity, and the estimated position.

Figure 7C:
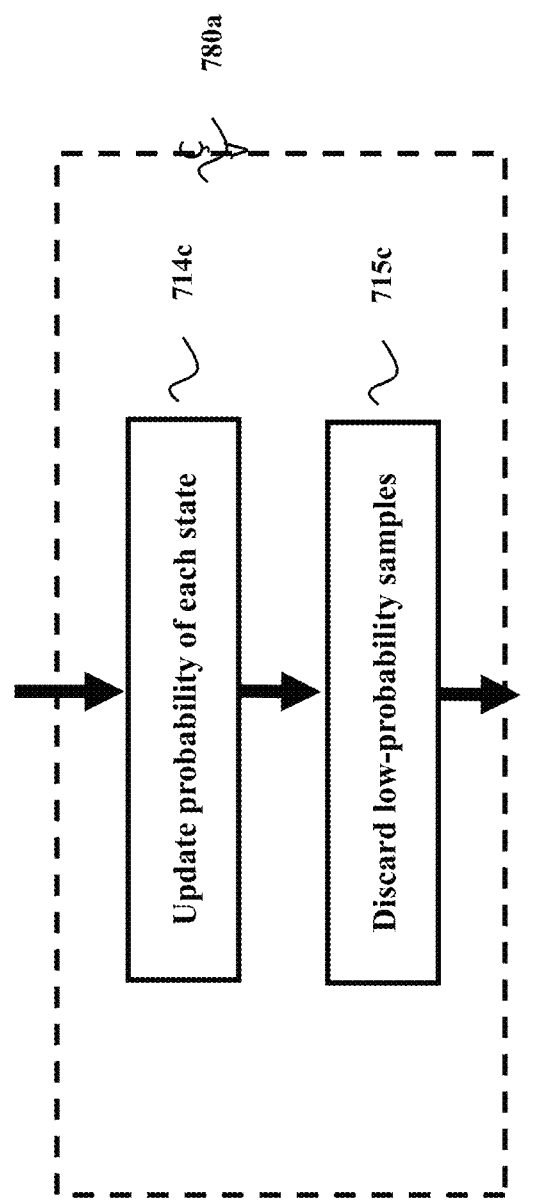
FIG. 7C shows a flowchart of an exemplar implementation of the method that determines probabilities of ambiguities.

FIG. 7C shows a flowchart of an exemplar implementation of the method 780a that determines probabilities of ambiguities. Using the estimated state and the measurement model, the implementation updates 714c the probability of each ambiguity based on the consistence with the measurements after correction; and prunes 715b the corrected sampled float values of carrier phase ambiguities to preserve the float values of carrier phase ambiguities with probabilities of fitting into the measurement model above a threshold.

Figure 8A:
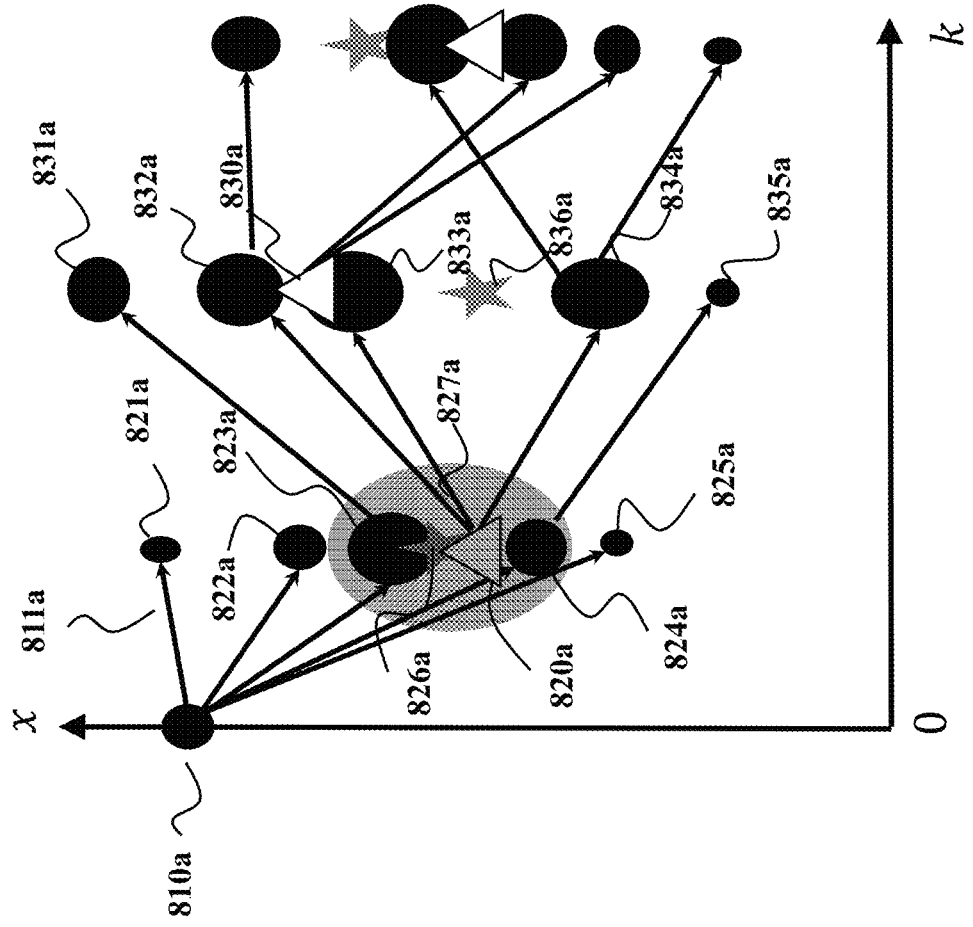
FIG. 8A shows a simplified schematic of the result of three iterations of executing the marginalized particle filter according to some embodiments.

FIG. 8A shows a simplified schematic of the result of three iterations of executing the MPF according to some embodiments. The initial state 810a is predicted forward in time 811a using the motion model and the five sampled ambiguities to produce five next states 821a, 822a, 823a, 824a, and 825a. The probabilities are determined as a function of the subset of measurements 826a and the measurement noise 827a of the subset of measurements 826a. At each time step, i.e., at each iteration, an aggregate of the probabilities is used to produce an aggregated ambiguity and corresponding state 820a.

Figure 8B:
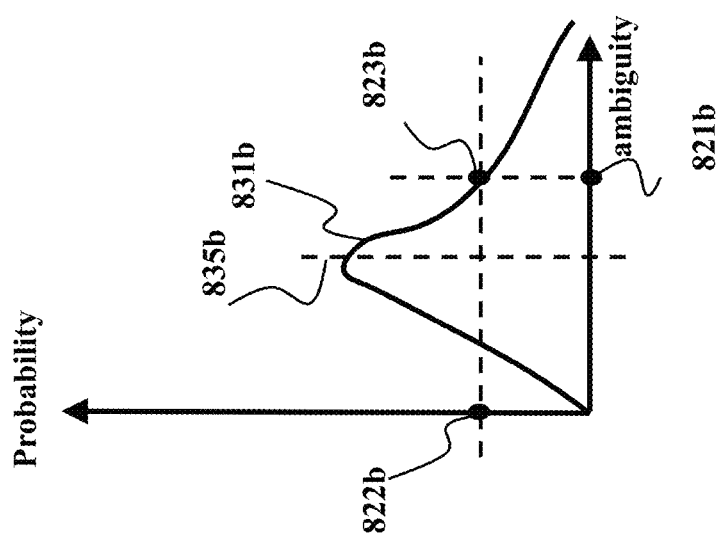
FIG. 8B shows a graph illustrating selection of the probability of the sampled ambiguities using the probability density function (PDF) 831b over possible states of the receiver according to one embodiment.

FIG. 8B shows possible assigned probabilities of the five states and ambiguities at the first iteration in FIG. 8A. Those probabilities 821b, 822b, 823b, 824b, and 825b are reflected in selecting the sizes of the dots illustrating the states 821a, 822a, 823a, 824a, and 825a.

FIG. 8B shows a graph illustrating selection of the probability of the sampled ambiguities using the probability density function (PDF) 831b over possible states of the receiver according to one embodiment. For example, the PDF 831b can be a probability distribution of the measurement model. The shape of such a probability distribution can be determined in advance, e.g., as a Gaussian or different shape, and the location of this probability distribution 831b is centered on the noiseless fit of the measured state 835b.

One embodiment determines a probability distribution of the state of the receiver and/or the ambiguity using a probability distribution 831b of the measurement model centered on the measured state, using the subset of measurements. To that end, the embodiment can determine the probability of each sampled ambiguity to represent the true ambiguity according to a placement of the ambiguity and the estimated position on the probability distribution of the state of the receiver and the ambiguity.

For example, the embodiment submits the ambiguity to the model of the subset of measurements of the carrier and code signal. The embodiment selects a value 822b of the PDF over states of the receiver at a point 823b corresponding to the fit of the measurement model of the subset of measurements with the ambiguity 821b to the measured state as the probability of the ambiguity to be accurate.

In some embodiments, when the probability of a sampled ambiguity is lower than a threshold, the corresponding ambiguity is removed from the determining and is replaced with a sampled ambiguity with higher probability. Doing in such a manner ensures that only sampled ambiguities that are more likely to be the correct ambiguity can be chosen.

Figure 8C:
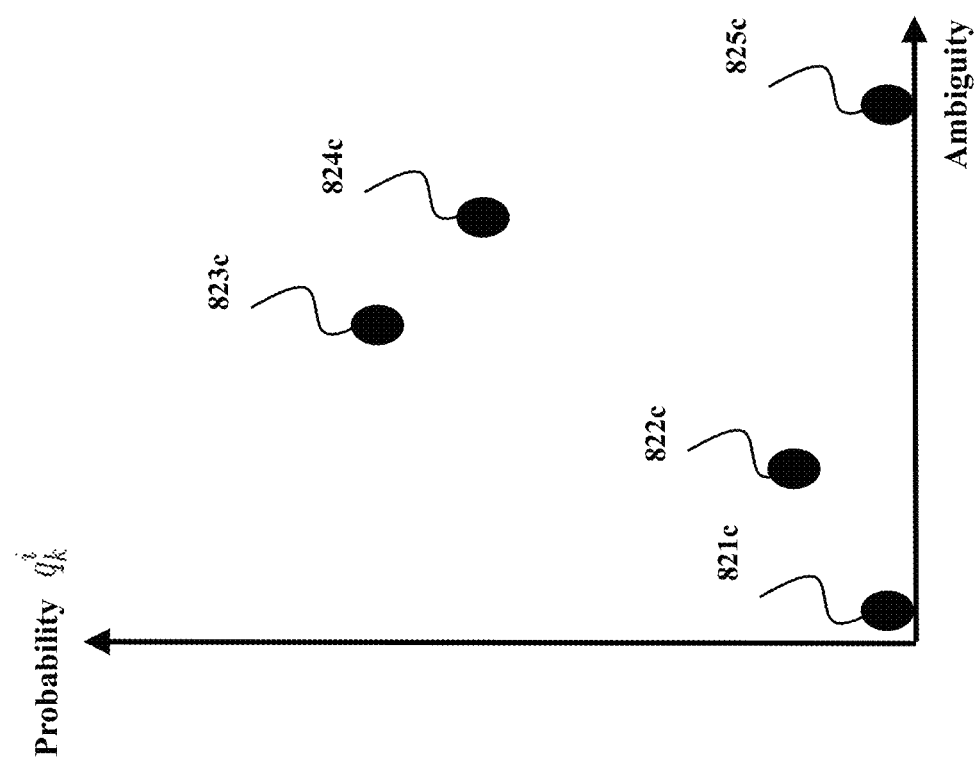
FIG. 8C shows a schematic of probabilities of the float values of the carrier phase ambiguities sampled according to some embodiments.

FIG. 8C shows a schematic of probabilities of the float values of the carrier phase ambiguities sampled according to some embodiments. FIG. 8C shows five float values of the carrier phase ambiguities having the assigned probabilities 821c, 822c, 823c, 824c, and 825c. The probabilities constitute a discrete distribution different from the exact range of possible ambiguities. One embodiment interpolates and extrapolates the probabilities of the float values of the carrier phase ambiguities to form a continuous probability density.

Figure 8D:
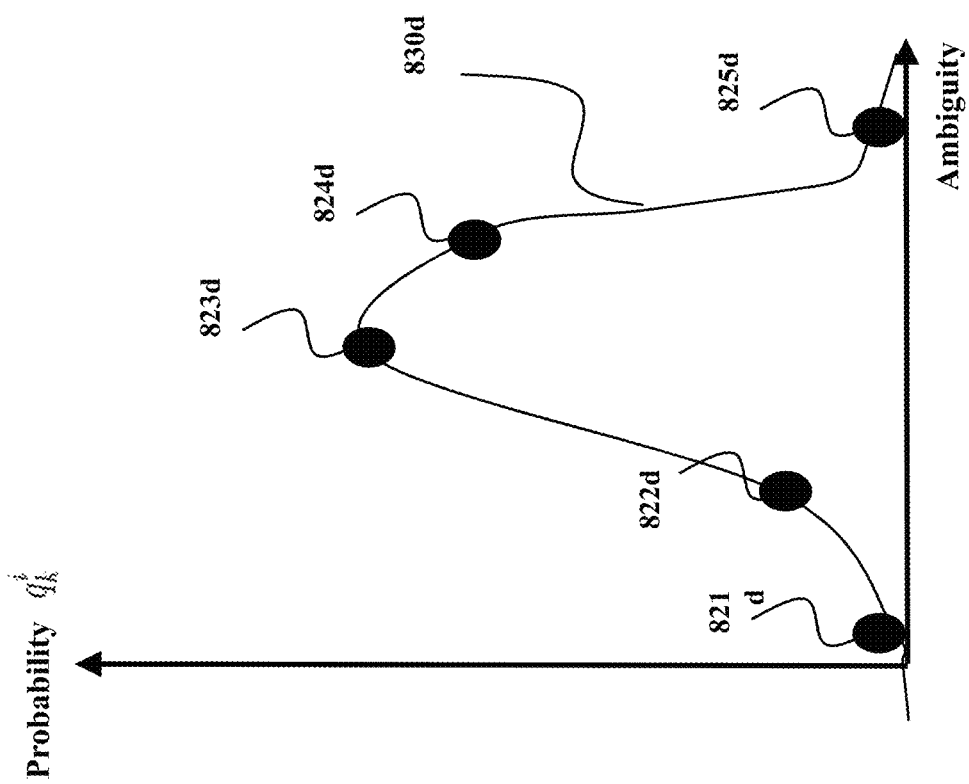
FIG. 8D shows an illustration of selecting different regions of ambiguity values according to one embodiment.

FIG. 8D shows an illustration of a result of a method for interpolating and extrapolating the probabilities of float values of the carrier phase ambiguities sampled according to some embodiments. The interpolating connects a curve 830d between the points, and the extrapolating makes the curve 830d extend beyond the discrete points.

In some embodiments, a section of the curve 830d is selected. For instance, FIG. 8D shows a situation where the region 840d is selected, which means that the ambiguity values corresponding to the region forms the basis of the set of possible integer values. The selecting can be done in several ways. For instance, one embodiment selects the section of the continuous PDF that is above the threshold 850d.

Based on the selected integer values, one embodiment executes a set of state estimators, where each state estimator uses a unique set of ambiguities in the measurement model.

For instance, one embodiment uses a set of Kalman filters that estimate the state using the motion model and adjust the estimated state using the measurement model with the subset of measurements of the carrier and the code signals adjusted according to the integer values of the carrier phase ambiguities selected for the state estimator. The Kalman filter determines the joint probability of the position based on a consistency of the adjusted state with the measurement model using the subset of measurements.

In one embodiment, a set of Kalman filters are executed, one for each sampled ambiguity, that estimate the state using the motion model and adjust the estimated state using the measurement model with the subset of measurements of the carrier and the code signals adjusted according to the values of the carrier phase ambiguities selected for the state estimator. The Kalman filter determines the joint probability of the position based on a consistency of the adjusted state with the measurement model using the subset of measurements.

For instance, in one embodiment the Kalman filter estimates the position and velocity and associated covariance as $$\hat{x}_{k+1|k} = F_k \hat{x}_{k|k},$$

$P_{k+1|k} = F_k P_{k|k} F_k^T + Q_{x,k}$, and adjusts the estimated position and covariance based on the subset of measurements carrier and code signal $$\hat{x}_{k|k}^i = \hat{x}_{k|k-1}^i + \tilde{K}_k (\tilde{y}_k - \hat{\tilde{y}}_{k|k-1}),$$

$$P_{k|k}^i = P_{k|k-1}^i - \tilde{K}_k \tilde{H}_k P_{k|k-1},$$

$$\hat{\tilde{y}}_{k|k-1} = \Psi_{k,\infty}[h(\hat{x}_{k|k-1}^i) + g(n_k^i)],$$

$$\tilde{S}_k = \tilde{H}_k P_{k|k-1} \tilde{H}_k^T + \tilde{R}_k,$$

$$\tilde{K}_k = P_{k|k-1} \tilde{H}_k^T \tilde{S}_k^{-1},$$

measurements as $$\tilde{H}_k = \Psi_{k,\infty} \frac{\partial h(x)}{\partial x}\bigg|_{x=\hat{x}_{k|k-1}},$$

where the ambiguity n is a vector of ambiguities, unique for each different Kalman filter, wherein $\Psi_{k,\infty}$ is the linear projection operator determined by other embodiments, wherein $\tilde{y} = \Psi_{k,\infty} y_k = \Psi_{k,\infty}(h(x_k) + g(n_k) + e_k)$, i.e., the subset of measurements, wherein $\tilde{R}_k = \Psi_{k,\infty} R_k \Psi_{k,\infty}^T$ is the measurement noise of the subset of measurements.

The executing the Kalman filters result in a mixture distribution of Gaussian distributions, $$p(x_k \mid y_{0:k}) = \sum_{i=1}^{N_S} \omega_k^i \mathcal{N}(x_k \mid \hat{x}_{k|k}^i, P_{k|k}^i),$$

where the $N_S$ different Kalman filters each produce a Gaussian distribution. The distribution of the state is a weighted distribution, where each weight $\omega_k^i$ reflects how good the state estimate is, therefore also it reflects how good the choice of ambiguities is.

One embodiment determines the weight as the probability of the particular choice of ambiguity values, that is, $\omega_k^i = p(n^i \mid y_{0:k})$. Another embodiment determines the probability of the particular choice of ambiguity values as the value when inserting the estimates from the Kalman filter into a Gaussian distribution, weighted with the probability of the ambiguity in the previous time step, $\omega_k^i \propto \omega_{k-1}^i \mathcal{N}(y_k \mid \hat{y}_{k|k-1}^i, S_k^i)$.

Several embodiments realize that to evaluate the quality of the estimation, i.e., the probability of each estimator, can be done by evaluating the Gaussian distribution when inserting the estimation and subset of measurements.

The determined weights can be used to determine the state estimate. For instance, one embodiment outputs the state estimate that is determined as a weighted combination of the estimates of all the Kalman filter, $$\hat{x}_{k|k}^{MV} = \sum_{i=1}^{N_S} \omega_k^i \hat{x}_{k|k}^i.$$

In other embodiments, the estimate is determined from the Kalman filter associated with the highest weight $\omega_k^i$.

Sometimes the set of possible combinations of ambiguities can change, for instance, due to loss-of-lock of a satellite for a period of time, receiving signals from more satellites, or multipath detection. In such cases, one embodiment resets the probabilistic filter and samples new ambiguities according to one embodiment.

When initializing the position estimate, there may be little information about where the receiver is located. Sometimes it is possible to acquire a coarse information from the base receiver, a car navigation system, or Wi-Fi stations. One embodiment samples positions around a first course estimate of the position to produce the positions of the receiver, where the spread of the sampling is consistent with the uncertainty of the model of the receiver.

Another source of error is loss of one or more satellites, from which position information is lost and the current estimate cannot be trusted. One embodiment resolves this by sampling states of the receiver in a neighborhood of the most recent known state to produce the state of the receiver consistent with the process noise of the motion model. For instance, one embodiment keeps track of the most recent known state estimate, samples around this estimate such that the samples are consistent with the process noise, and propagates the sampled state with the motion model.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A system for tracking a state of a receiver of a global navigational satellite system (GNSS), comprising:
   an input interface to accept motion data indicative of a change of a state of the receiver and measurements of satellite signals including a combination of carrier signals and code signals transmitted from a set of GNSS satellites, wherein a measurement for each satellite signal includes at least a single difference measurement of a satellite signal to represent a relative position of the receiver of the satellite signal with respect to a position of a satellite transmitting the satellite signal subject to integer ambiguity of the carrier signal of the satellite and noise, such that all possible measurements for each satellite signal at a current time step form a set of measurements;
   a memory configured to store a motion model transitioning a previous state of the receiver to a current state of the receiver according to the motion data, wherein the motion model is a probabilistic model subject to process noise, to store a measurement model relating a subset of the measurements of satellite signals to the current state of the receiver, wherein the size of the subset of measurements is less than the size of the set of measurements, and wherein the measurement model is a probabilistic model subject to measurement noise, and to store a state estimator configured to track the state of the receiver using a joint probability of the state of the receiver estimated by the motion model and the measurement model; and
   a processor to track the state of the receiver, the processor is configured to
      select the subset of measurements, wherein each measurement in the subset of measurements is formed by a weighted combination of multiple different measurements from the set of measurements; and
      execute the state estimator with the motion model using the motion data and the measurement model using the selected subset of measurements to estimate the state of the receiver.

2. The system of claim 1, wherein weights of the weighted combination of different measurements forming a measurement in the subset of measurements are selected such that the weighted combination of integer ambiguities of the different measurements is not an integer value.

3. The system of claim 1, wherein the weighted combination of different measurements is normalized, such that the weights of the weighted combination sums to one.

4. The system of claim 1, wherein the weights are selected according to optimization of elements of the Fisher information matrix by minimizing a loss of information with respect to the set of measurements.

5. The system of claim 4, wherein the Fisher information matrix defines a space in a system of coordinates of the set of measurements, wherein the processor finds a surface of the space corresponding to the subset of measurements and finds a point on the surface with maximum value of elements of the Fisher information matrix, wherein the Fisher information matrix is determined by a projection operator projecting the set of measurements to the subset of measurements using a linear projection operator.

6. The system of claim 5, wherein the processor determines the projection operator by minimizing a trace of the inverse of the Fisher information matrix.

7. The system of claim 5, wherein the projection operator is determined by an iterative gradient descent solver.

8. The system of claim 5, wherein the projection operator is normalized.

9. The system of claim 4, wherein the processor is configured to determine a coarse position of the receiver corresponding to at least one code signal;
   determine the Fisher information matrix by inserting the coarse position into the measurement model;
   determine a projection operator that reduces the Fisher information matrix to a reduced Fisher information matrix of the size of the subset of measurements by minimizing the loss of information in the reduced Fisher information matrix with respect to the Fisher information matrix; and
   apply the projection operator to the measurement matrix to produce the subset of measurements.

10. The system of claim 9, wherein the processor is further configured to
    determine iteratively, until a termination condition is met, the projection operator that optimizes a Cramer-Rao bound (CRB) of the reduced Fisher information matrix.

11. The system of claim 10, wherein, for performing an iteration, the processor is configured to
    determine a Cramer-Rao bound (CRB) by summing diagonal elements of the inverse of the reduced Fisher information matrix;
    determine a partial derivative of the CRB with respect to the projection operator; and
    update the projection operator in the direction of the partial derivative.

12. The system of claim 10, wherein the processor is further configured to
    determine the CRB for the size of the subset of measurements and determining the CRB for the full set of measurements; and
    increase the size of the subset of measurements if a ratio of the CRB of subset of measurements to the CRB of the set of measurements is less than a threshold.

13. The system of claim 1, wherein the estimator is a Kalman filter, wherein the processor is configured to
    determine a set of possible combinations of integer values of the carrier phase ambiguities consistent with the measurements of the carrier signal and the code signal according to one or combination of the motion model and the measurement model within bounds defined by one or combination of the process noise and the measurement noise; and
    execute a set of state estimators determining states of the receiver by jointly using the motion model and the measurement model, each state estimator determines a joint probability distribution of the state of the receiver with respect to the motion model and the measurement model, wherein the measurement models of at least some different state estimators include different combinations of integer values of the carrier phase ambiguities selected from the set of possible combinations.

14. The system of claim 1, wherein the receiver is arranged at a moving object, wherein the system includes a controller configured to control motion of the object based on the estimate state of the receiver.

15. The system of claim 1, wherein the state estimator is a Kalman filter.

16. The system of claim 1, wherein the state estimator is a particle filter including the integer ambiguities as state variables in the state of the receiver.

17. The system of claim 1, wherein the state estimator is a marginalized particle filter having the integer ambiguities as particles, wherein each particle includes a Kalman filter.

18. A method for tracking a state of a receiver of a global navigational satellite system (GNSS), wherein the method uses a processor coupled to a memory storing a motion model transitioning a previous state of the receiver to a current state of the receiver according to the motion data, wherein the motion model is a probabilistic model subject to process noise, and a measurement model relating a subset of the measurements of satellite signals to the current state of the receiver, and wherein the measurement model is a probabilistic model subject to measurement noise, and a state estimator configured to track the state of the receiver using a joint probability of the state of the receiver estimated by the motion model and the measurement model, wherein the processor is coupled with stored instructions implementing the method, wherein the instructions, when executed by the processor carry out steps of the method, comprising:

accepting motion data indicative of a change of a state of the receiver;

accepting measurements of satellite signals including a combination of carrier signals and code signals transmitted from a set of GNSS satellites, wherein a measurement for each satellite signal includes a single difference between the satellite signal transmitted by a satellite and another satellite signal to include a relative position of the receiver of the satellite signal with respect to a position of the satellite subject to integer ambiguity of the carrier signal of the satellite and noise, such that all possible measurements for each satellite signal form a set of measurements;

selecting the subset of measurements, wherein each measurement in the subset of measurements is formed by a weighted combination of multiple different measurements from the set of measurements; and executing the state estimator with the motion model using the motion data and the measurement model using the selected subset of measurements to estimate the state of the receiver.

19. A non-transitory computer readable storage medium embodied thereon a program executable by a processor for performing a method, wherein the medium stores a motion model transitioning a previous state of the receiver to a current state of the receiver according to the motion data, wherein the motion model is a probabilistic model subject to process noise, and a measurement model relating a subset of the measurements of satellite signals to the current state of the receiver, and wherein the measurement model is a probabilistic model subject to measurement noise, and a state estimator configured to track the state of the receiver using a joint probability of the state of the receiver estimated by the motion model and the measurement model, the method comprising:

accepting motion data indicative of a change of a state of the receiver;

accepting measurements of satellite signals including a combination of carrier signals and code signals transmitted from a set of GNSS satellites, wherein a measurement for each satellite signal includes a single difference between the satellite signal transmitted by a satellite and another satellite signal to include a relative position of the receiver of the satellite signal with respect to a position of the satellite subject to integer ambiguity of the carrier signal of the satellite and noise, such that all possible measurements for each satellite signal form a set of measurements;

selecting the subset of measurements, wherein each measurement in the subset of measurements is formed by a weighted combination of multiple different measurements from the set of measurements; and executing the state estimator with the motion model using the motion data and the measurement model using the selected subset of measurements to estimate the state of the receiver.

* * * * *